(12) United States Patent
Son et al.

(10) Patent No.: US 12,501,762 B2
(45) Date of Patent: Dec. 16, 2025

(54) DISPLAY DEVICE

(71) Applicant: Samsung Display Co., Ltd., Yongin-si (KR)

(72) Inventors: Sunkwun Son, Yongin-si (KR); Dong Hee Shin, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/653,794

(22) Filed: May 2, 2024

(65) Prior Publication Data

US 2025/0048825 A1 Feb. 6, 2025

(30) Foreign Application Priority Data

Aug. 1, 2023 (KR) .......................... 10-2023-0100352

(51) Int. Cl.
*H10K 39/34* (2023.01)
*G09G 3/3233* (2016.01)
*G06V 40/13* (2022.01)

(52) U.S. Cl.
CPC .......... *H10K 39/34* (2023.02); *G09G 3/3233* (2013.01); *G06V 40/1318* (2022.01); *G09G 2300/0413* (2013.01); *G09G 2300/0426* (2013.01); *G09G 2300/043* (2013.01); *G09G 2300/0819* (2013.01); *G09G 2300/0842* (2013.01); *G09G 2320/0238* (2013.01); *G09G 2354/00* (2013.01); *G09G 2360/14* (2013.01)

(58) Field of Classification Search
CPC ......... G09G 3/3233; G09G 2300/0413; G09G 2300/0426; G09G 2300/043; G09G 2300/0819; G09G 2300/0842; G09G 2320/0238; G09G 2354/00; G09G 2360/14; H10K 39/34; G06V 40/1318
USPC ........................................................ 345/205
See application file for complete search history.

(56) References Cited

U.S. PATENT DOCUMENTS

| | | | |
|---|---|---|---|
| 11,790,687 B2 | 10/2023 | Han et al. | |
| 11,955,078 B2* | 4/2024 | Song | G09G 3/3233 |
| 2019/0187353 A1 | 6/2019 | Kuo et al. | |
| 2023/0363239 A1* | 11/2023 | Song | H10K 59/50 |
| 2024/0284753 A1* | 8/2024 | Lee | H10K 59/40 |
| 2024/0357860 A1* | 10/2024 | Yoo | H10K 39/34 |
| 2025/0024721 A1* | 1/2025 | Song | H10D 86/60 |

FOREIGN PATENT DOCUMENTS

| | | |
|---|---|---|
| KR | 10-2159241 B1 | 9/2020 |
| KR | 10-2022-0009562 A | 1/2022 |

* cited by examiner

*Primary Examiner* — Tom V Sheng
(74) *Attorney, Agent, or Firm* — Womble Bond Dickinson (US) LLP

(57) ABSTRACT

A display device includes: a data line; a pixel circuit connected to the data line; a light emitting element connected to the pixel circuit; a first connection electrode under the data line; a sensing circuit connected to the first connection electrode; a light receiving element connected to the sensing circuit; and a receive line under the first connection electrode and connected to the first connection electrode.

21 Claims, 19 Drawing Sheets

DISPLAY DEVICE

CROSS-REFERENCE TO RELATED APPLICATION

The present application claims priority to and the benefit of Korean Patent Application No. 10-2023-0100352, filed on Aug. 1, 2023, in the Korean Intellectual Property Office, the entire disclosure of which is incorporated herein by reference.

BACKGROUND

1. Field

Aspects of some embodiments of the present disclosure described herein relate to a display device.

2. Description of the Related Art

An electronic device, such as a smart phone, a digital camera, a notebook computer, a navigation, and a smart television, that display images to users includes a display device to display the images. The display device includes a display panel to generate images, an input device such as an input sensing unit, a camera to capture external images, and various sensors.

The input sensing part may be located on the display panel to sense the touch of users. The sensors may include, for example, fingerprint sensors, proximity sensors, and illuminance sensors. The fingerprint sensor of sensors may sense a fingerprint provided on the display panel. The fingerprint sensor is manufactured using a separate module and located in the display device.

The above information disclosed in this Background section is only for enhancement of understanding of the background and therefore the information discussed in this Background section does not necessarily constitute prior art.

SUMMARY

Aspects of some embodiments of the present disclosure include a display device capable of relatively improving the sensitivity of a sensor.

According to some embodiments of the present disclosure, a display device may include a data line, a pixel circuit connected to the data line, a light emitting element connected to the pixel circuit, a first connection electrode under the data line, a sensing circuit connected to the first connection electrode, a light receiving element connected to the sensing circuit, and a receive line under the first connection electrode and connected to the first connection line.

According to some embodiments of the present disclosure, a display device may include a data line, a pixel circuit connected to the data line, a light emitting element connected to the pixel circuit, a lower metal layer under the pixel circuit, a receive line in the same layer as the lower metal layer, a sensing circuit connected to the receive line, and a light receiving element connected to the sensing circuit.

BRIEF DESCRIPTION OF THE DRAWINGS

The above and other aspects and features of the present disclosure will become apparent by describing in more detail aspects of some embodiments thereof with reference to the accompanying drawings.

DETAILED DESCRIPTION

Figure 1:
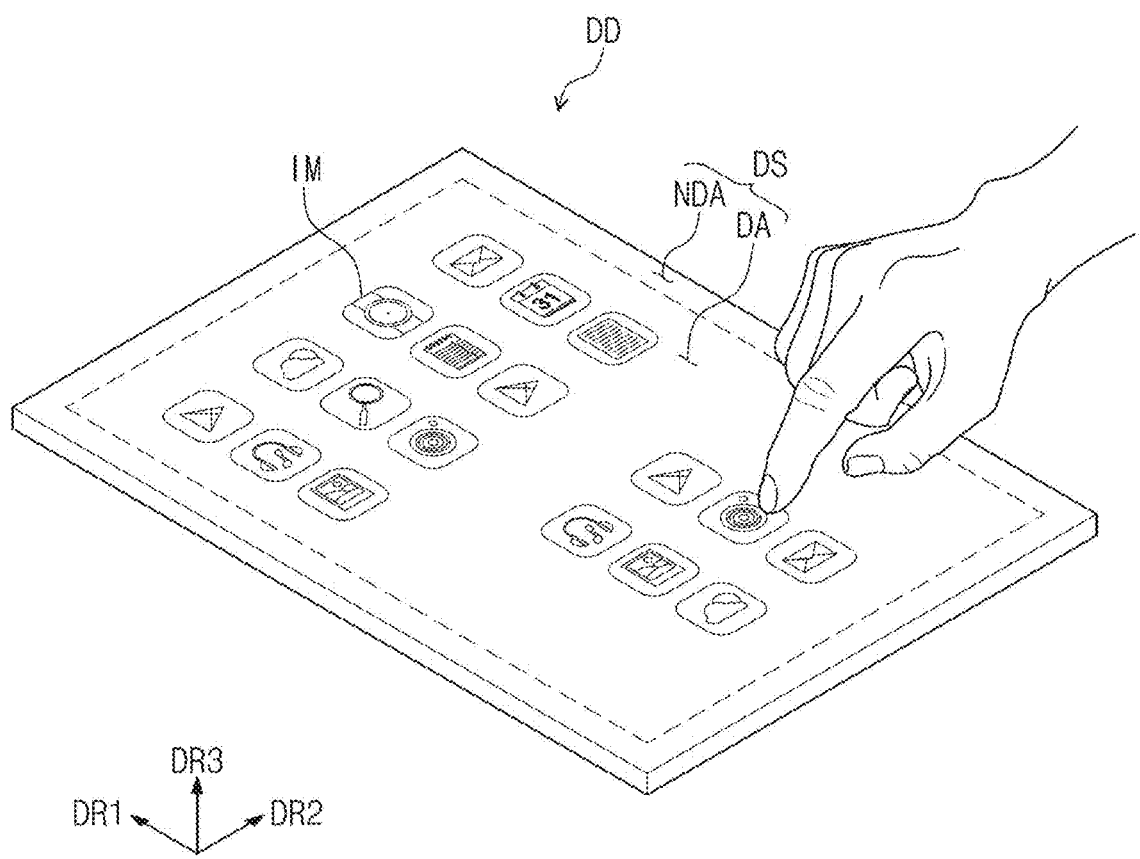
FIG. 1 is a perspective view of a display device according to some embodiments of the present disclosure.

In the specification, the expression that a first component (or region, layer, part, portion, etc.) is "on", "connected to", or "coupled to" a second component means that the first component is directly on, connected to, or coupled to the second component or means that a third component is interposed therebetween.

The same reference numeral will be assigned to the same component. In addition, in drawings, thicknesses, proportions, and dimensions of components may be exaggerated to describe the technical features effectively.

The term "and/or" includes any and all combinations of one or more of associated components Although the terms "first", "second", etc. may be used to describe various components, the components should not be construed as being limited by the terms. The terms are only used to distinguish one component from another component. For example, without departing from the scope and spirit of the invention, a first component may be referred to as a second component, and similarly, the second component may be referred to as the first component. The singular forms are intended to include the plural forms unless the context clearly indicates otherwise.

In addition, the terms "under", "at a lower portion", "above", "an upper portion" are used to describe the relationship between components illustrated in drawings. The terms are relative and are described with reference to a direction indicated in the drawing.

Unless otherwise defined, all terms (including technical terms and scientific terms) used in the specification have the same meaning as commonly understood by one skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

It will be further understood that the terms "comprises," "comprising," "includes," or "including," or "having" specify the presence of stated features, numbers, steps, operations, components, parts, or the combination thereof, but do not preclude the presence or addition of one or more other features, numbers, steps, operations, components, components, and/or the combination thereof.

Hereinafter, embodiments of the present disclosure will be described with reference to accompanying drawings.

FIG. 1 is a perspective view of a display device according to some embodiments of the present disclosure.

Referring to FIG. 1, according to some embodiments of the present disclosure, a display device DD may have a shape of a rectangle having a longer side extending in a first direction DR1, shorter side extending in a second direction DR2 crossing the first direction DR1. However, embodiments according to the present disclosure are not limited thereto, and the display device DD may have various shapes such as a circle or a polygon.

Hereinafter, a direction substantially perpendicular to a plane defined by the first direction DR1 and the second direction DR2 is defined as a third direction DR3. In the specification, the meaning of "when viewed from above a plane" or "in a plan view" may mean "when viewed from the third direction DR3".

A top surface of the display device DD may be defined as a display surface DS and may have the plane defined by the first direction DR1 and the second direction DR2. Images IM generated by the display device DD may be displayed to a user through the display surface DS in the third direction DR3.

The display surface DS may include a display region DA and a non-display region NDA around the display region DA. The display region DA is to display an image and the non-display region NDA is not to display the image. The non-display region NDA may be defined as an edge of the display device DD to surround the display region DA and printed with a specific color.

The display device DD may be used for a large electronic device such as a television, a monitor, or an outer billboard. In addition, the display device DD may be used for small and medium display devices such as a personal computer, a laptop computer, a personal digital terminal, a car navigation system, a game console, a smartphone, a tablet, or a camera. The above examples are provided only as examples, and as a person having ordinary skill in the art would appreciate, the display device DD may be applied to any other electronic device(s) without departing from spirit and scope of embodiments according to the present disclosure.

Figure 2:
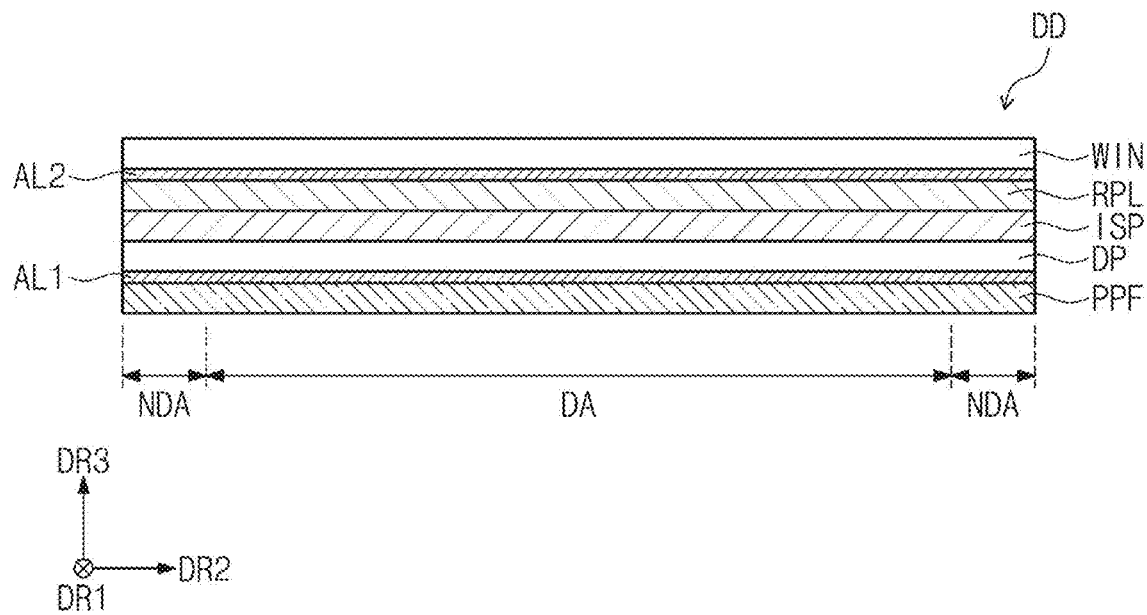
FIG. 2 is a cross-sectional view illustrating the display device illustrated in FIG. 1.

FIG. 2 is a cross-sectional view illustrating the display device illustrated in FIG. 1.

For example, FIG. 2 illustrates a cross-sectional view of the display device DD when viewed in the first direction DR1.

Referring to FIG. 2, the display device DD may include a display panel DP, an input sensing unit ISP, an anti-reflective layer RPL, a window WIN, a panel protecting film PPF, and first to second adhesive layers AL1 to AL2.

According to some embodiments of the present disclosure, the display panel DP may be a light emissive-type display panel, but the present disclosure is not limited thereto. For example, the display panel DP may be an organic light emitting display panel or an inorganic light emitting display panel. The light emitting layer of the organic light emitting display layer may include an organic light emitting material. The light emitting layer of the inorganic light emitting display panel may include a quantum dot, or a quantum rod. Hereinafter, the display panel DP is an organic light emitting display panel.

The input sensing unit ISP may be directly located on the display panel DP. The input sensing unit ISP may include a plurality of sensing units to sense an external input in a capacitive manner. The input sensing unit ISP may be directly formed on the display panel DP when manufacturing the display device DD. However, embodiments according to the present disclosure are not limited thereto. The input sensing unit ISP is manufactured separately from the display panel DP, and may be attached to the display panel DP by the adhesive layer The anti-reflective layer RPL may be located on the input sensing unit ISP. The anti-reflective layer RPL may be located on the input sensing unit ISP, when the display device DD is manufactured. However, the present disclosure is not limited thereto. The anti-reflective layer RPL may be manufactured using an additional panel and may be attached to the input sensing unit ISP through the adhesive layer.

The anti-reflective layer RPL may be defined as a film to prevent or reduce instances of external light being reflected. The anti-reflective layer RPL may relatively reduce the reflectance of external light incident from the top surface of the display device DD toward the display panel DP. The external light may not be viewed to the user due to the anti-reflective layer RPL.

When the external light toward the display panel DP is reflected from the display panel DP and provided again to an external user, the user may visually view the external light, which is similar to a mirror. To prevent or reduce the above phenomenon, the anti-reflective layer RPL may include a plurality of color filters to display the same color as that of the pixels of the display panel DP.

The color filters may filter the external light in the same color as that of the pixels. In this case, the external light may not be viewed by the user. However, the present disclosure is not limited thereto. For example, the anti-reflective layer RPL may include a phase retarder and/or a polarizer, to relatively reduce the reflective index of the external light.

The window WIN may be located on the anti-reflective layer RPL. The window WIN may protect the display panel DP, the input sensing unit ISP, and the anti-reflective layer RPL from external scratches and impacts.

A panel protecting film PPF may be located under the display panel DP. The panel protecting film PPF may protect a bottom surface of the display panel DP. The panel protecting film PPF may include a flexible plastic material such as Polyethyleneterephthalate (PET).

A first adhesive layer AL1 may be interposed between the display panel DP and the panel protecting film PPF, and the display panel DP and the panel protecting film PPF may be combined with each other by the first adhesive layer AL1. A second adhesive layer AL2 may be interposed between the window WIN and the anti-reflective layer RPL to combine the window WIN with the anti-reflective layer RPL by the second adhesive layer AL2.

Figure 3:
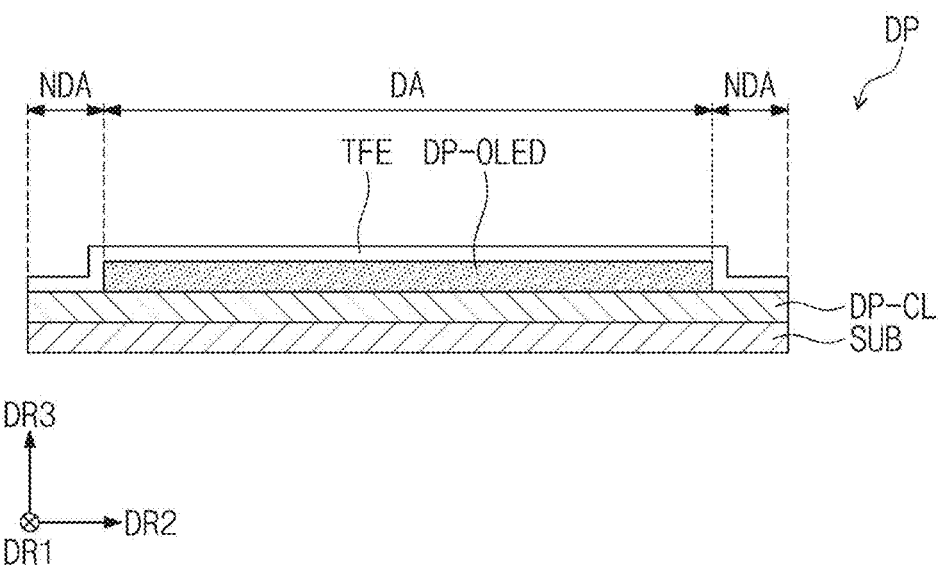
FIG. 3 is a cross-sectional view illustrating a display panel illustrated in FIG. 2.

FIG. 3 is a cross-sectional view illustrating a display panel illustrated in FIG. 2.

For example, FIG. 3 illustrates a cross-sectional view of the display panel DP when viewed in the first direction DR1.

Referring to FIG. 3, the display panel DP includes a substrate SUB, a circuit element layer DP-CL located on the substrate SUB, a display element layer DP-OLED located on the circuit element layer DP-CL, and a thin film encapsulating layer TFE located on the display element layer DP-OLED.

The substrate SUB may include the display region DA and the non-display region NDA around the display region DA. The substrate SUB may include a flexible plastic material such as glass or polymide (PI). The display element layer DP-OLED is located in the display region DA.

A plurality of pixels may be located on the circuit element layer DP-CL and the display element layer DP-OLED. Each of the pixels may include a transistor located in the circuit element layer DP-CL and a light emitting element located in the display element layer DP-OLED to be connected to the transistor.

The thin film encapsulating layer TFE may be located on the circuit element layer DP-CL to cover the display element layer DP-OLED. The thin film encapsulating layer TFE may protect pixels from moisture, oxygen, and external foreign substances.

Figure 4:
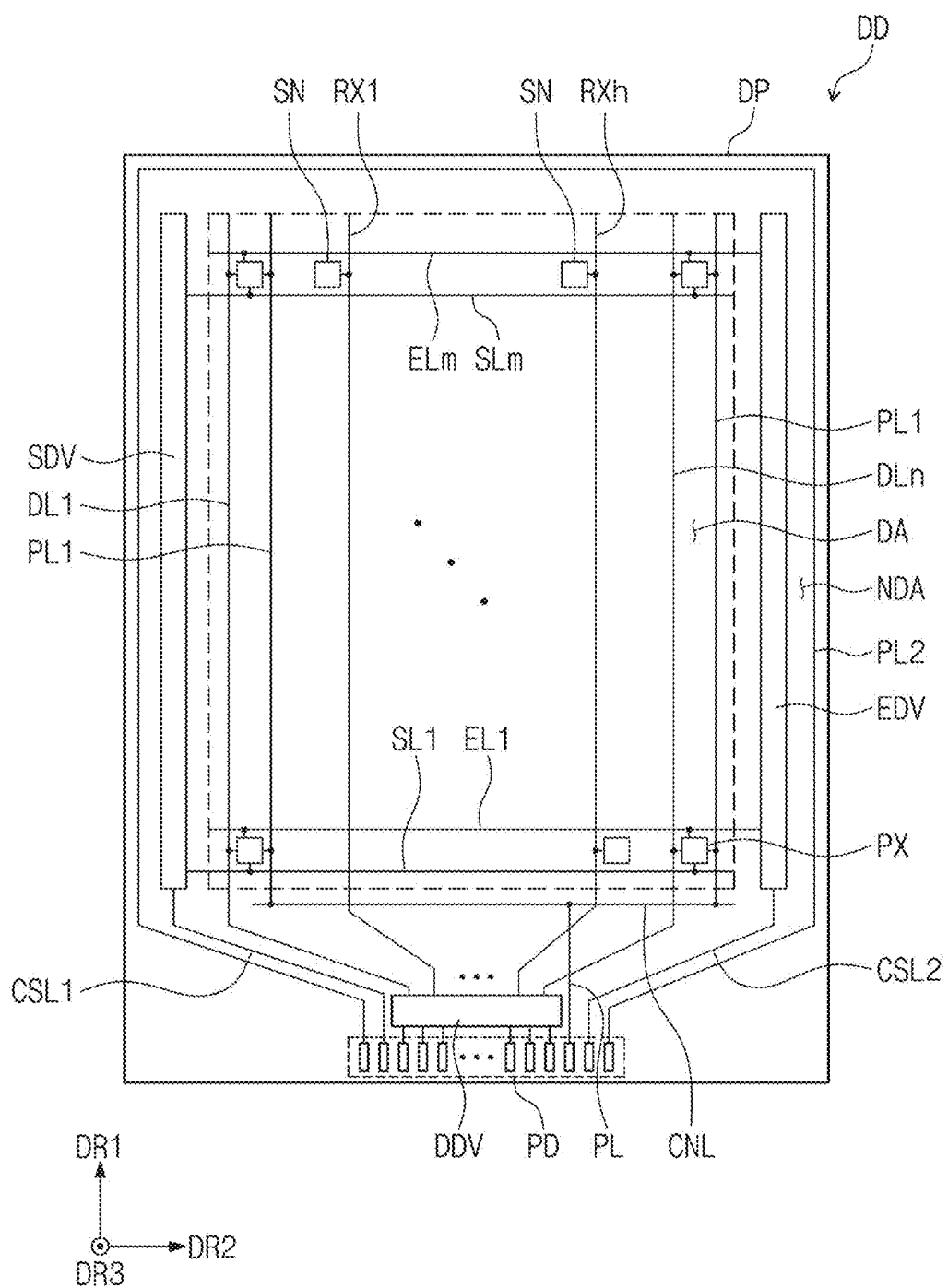
FIG. 4 is a plan view of a display panel illustrated in FIG. 2.

FIG. 4 is a plan view of a display panel illustrated in FIG. 2.

Referring to FIG. 4, the display device DD may include the display panel DP, a scan driver SDV, a plurality of data driver DDV, a light emitting driver EDV, and a plurality of pads PD.

Although the display panel DP may have the shape of a rectangle having a longer side extending in the first direction DR1 and a shorter side extending in the second direction DR2, the shape of the display panel DP is not limited thereto. The display panel DP may include the display region DA and the non-display region NDA surrounding the display region DA.

The display panel DP may include a plurality of pixels PX, a plurality of sensors SN, a plurality of scan lines SL1 to SLm, a plurality of data lines DL1 to DLn, a plurality of light emitting lines EL1 to Elm, a plurality of receive lines RX1 to RXh, first and second control lines CSL1 and CSL2, a power line PL, a common line CNL, first power supply lines PL1, and second power supply lines PL2. In this case, 'h', 'm', and 'n' are natural numbers.

The pixels PX may be located in the display region DA. The scan driver SDV and the light emitting driver EDV may be located in the non-display region NDA adjacent to the longer sides of the display panel DP, respectively. The data driver DDV may be located in the non-display region NDA adjacent to one of the shorter sides of the display panel DP. When viewed in a plan view, the data driver DDV may be adjacent to a bottom end of the display panel DP.

The scan lines SL1 to SLm may extend in the second direction DR2 to be connected to the pixels PX and the scan driver SDV. The data lines DL1 to DLn may extend in the first direction DR1 to be connected to the pixels PX and the data driver DDV. The light emitting lines EL1 to ELm may extend in the second direction DR2 to be connected to the pixels PX and the light emitting driver EDV.

The display panel DP may include a sensing unit to sense a fingerprint. The sensing unit may include sensors SN. The sensing unit to sense the fingerprint may be embedded in the display panel, instead of being manufactured through an additional module. The configuration of sensors SN will be described in detail.

The receive lines RX1 to RXh may extend in the first direction DR1 and may be arranged in the second direction DR2. In this case, 'h' is a natural number. The receive lines RX1 to RXh may be connected to the sensors SN and the data driver DDV. The signals sensed by the sensors SN may be output to the outside of the display panel DP through the receive lines RX1 to RXh and the data driver DDV.

The power line PL may extend in the first direction DR1 and may be located in the non-display region NDA. When viewed in a plan view, the common line CNL may be located in the non-display region NDA adjacent to the lower portion of the display region DA and extend in the second direction DR2. The common line CNL may be connected to the power line PL.

The first power lines PL1 may be located in the display region DA, may extend in the first direction DR1 and may be arranged in the second direction DR2. The first power lines PL1 may be connected to the common line CNL and the pixels PX. The first voltage may be applied to the power line PL. The first voltage may be applied to the pixels PX through the power line PL, the common line CNL, and the first power lines PL1.

The second power line PL2 may be located in the non-display region NDA, and may extend along the longer sides of the display panel DP and another shorter side of the display panel DP at which the data driver DDV is not located. The second power line PL2 may be located outside the scan driver SDV and the light emitting driver EDV.

According to some embodiments, the second power line PL2 may extend toward the display region DA to be connected to the pixels PX. A second voltage having a level lower than a first voltage may be applied to the pixels PX through the second power line PL2.

The first control line CSL1 may be connected to the scan driver SDV, and may extend toward the lower end portion of the display panel DP. The second control line CSL2 may be connected to the light emitting driver EDV, and may extend toward the lower end portion of the display panel DP. The data driver DDV may be interposed between the first control line CSL1 and the second control line CSL2.

The pads PD may be located in the non-display region NDA adjacent to the lower end portion of the display panel DP, and may be more adjacent to the lower end portion of the display panel DP rather than the data driver DDV. The data driver DDV, the first and second power lines PL1 and PL2, and the first and second control lines CSL1 and CSL2 may be connected to the pads PD.

The data lines DL1 to DLn and the receive lines RX1 to RXh may be connected to the data driver DDV. The data driver DDV may be connected to the pads PD corresponding to the data lines DL1 to DLn and the receive lines RX1 to RXh.

According to some embodiments, the display device DD may further include a timing controller to control operations of the scan driver SDV, the data driver DDV, and the light emitting driver EDV, and a voltage generator to generate first and second voltages. The timing controller and the voltage generator may be connected to the corresponding pads PD through a printed circuit board.

The scan driver SDV generates a plurality of scan signals, and the scan signals may be applied to the pixels PX through scan lines SL1 to SLm. The data driver DDV may generate a plurality of data voltages. The data voltages may be applied to the pixels PX through the data lines DL1 to DLn. The light emitting driver EDV may generate a plurality of light emitting signals, and the light emitting signals may be applied to the pixels PX through the light emitting lines EL1 to ELm.

The pixels PX may provide data voltages in response to the scan signals. The pixels PX may display the image, as the pixels PX emit light having brightness corresponding to data voltages, in response to the light emitting signals.

Figure 5:
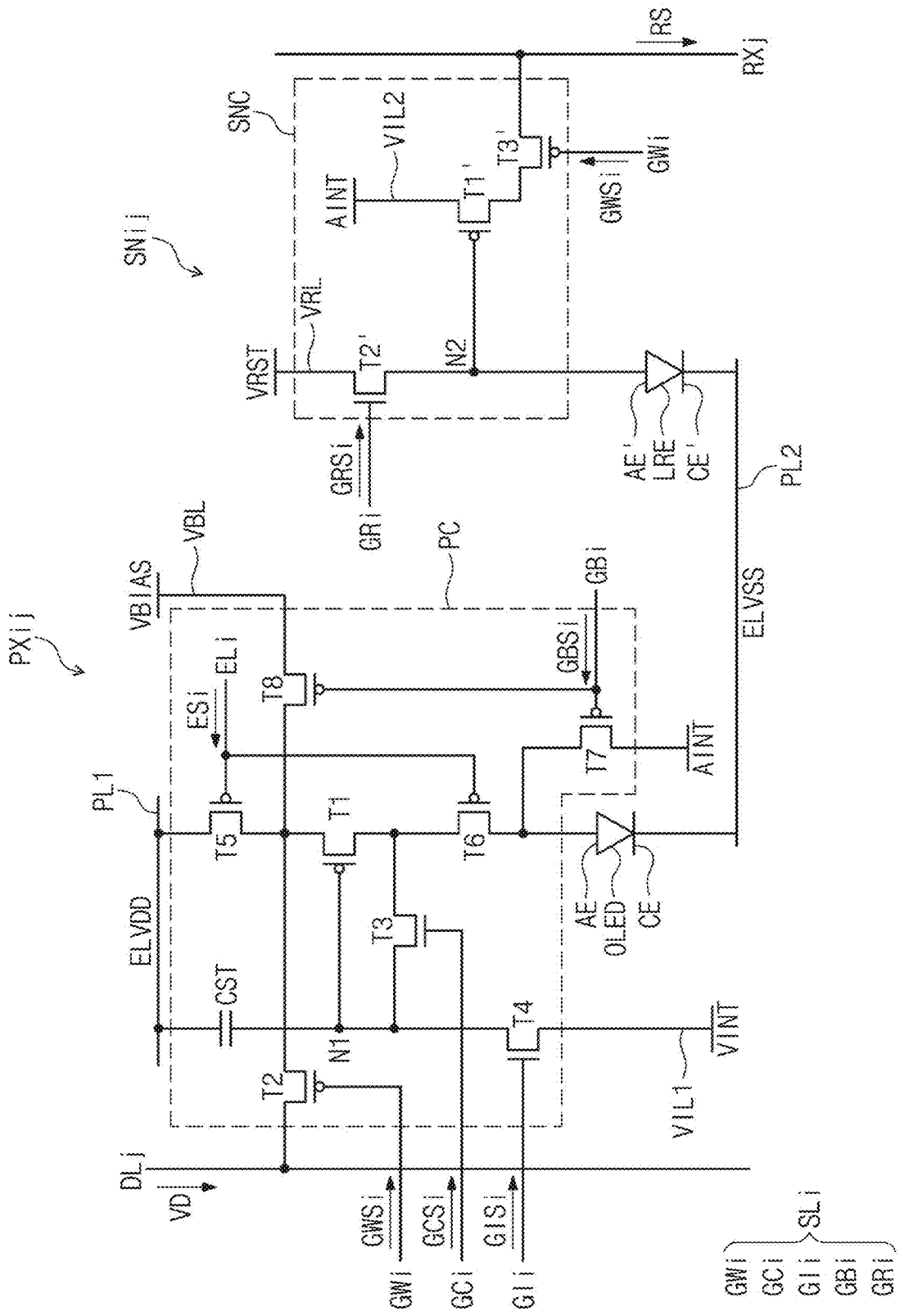
FIG. 5 is a view illustrating an equivalent circuit of any one pixel of pixels illustrated in FIG. 4 and a sensor adjacent to the pixel.

FIG. 5 is a view illustrating an equivalent circuit of any one pixel of pixels illustrated in FIG. 4 and a sensor adjacent to the pixel.

For example, FIG. 5 illustrates a pixel PXij connected to an i-th scan line SLi, an i-th light emitting line ELi, and a j-th data line DLj. In addition, FIG. 5 illustrates a sensor SNij connected to a i-th reset scan line GRi and a j-th receive line RXj. In this case, "i" and "j" are natural numbers.

Referring to FIG. 5, the pixel PXij may include a pixel circuit PC and a light emitting element OLED connected to the pixel circuit PC. The pixel circuit PC may drive the light emitting element OLED.

The pixel circuit PC may include a plurality of transistors T1 to T8 and a capacitor CST. The transistors T1 to T8 and the capacitor CST may control an amount of current flowing through the light emitting element OLED. The light emitting element OLED may generate light having a luminance (e.g., a set or predetermined luminance) based on the amount of current provided.

The i-th scan line SLi may include an i-th write scan line GWi, an i-th compensating scan line GCi, an i-th initializing scan line Gli, an i-th bias scan line GBi, and the i-th reset scan line GRi.

The i-th write scan line GWi may receive an i-th write scan signal GWSi, and the i-th compensating scan line GCi may receive an i-th compensating scan signal GCSi. The i-th initializing scan line Gli may receive an i-th initializing scan signal GISi, and the i-th bias scan line GBi may receive an i-th bias scan signal GBSi. The i-th reset scan line GRi may receive an i-th reset scan signal GRSi. The i-th light emitting line ELi may receive an i-th light emitting signal ESi.

The pixel PXij may be connected to the j-th data line DLj, the i-th write scan line GWi, athen i-th compensating scan line GCi, the i-th initializing scan line Gli, the i-th bias scan line GBi, the i-th light emitting line ELi, a first initializing line VIL1, a second initializing line VIL2, a bias line VBL, and first and second power lines PL1 and PL2.

The pixel circuit PC may be connected to the j-th data line DLj, the i-th write scan line GWi, the i-th compensating scan line GCi, the i-th initializing scan line Gli, the i-th bias scan line GBi, the i-th light emitting line ELi, the first initializing line VIL1, the second initializing line VIL2, the bias line VBL, and the first power line PL1. The light emitting element OLED may be connected to the second power line PL2.

The first initializing line VIL1 may receive a first initializing voltage VINT, and the second initializing line VIL2 may receive a second initializing voltage AINT. The bias line VBL may receive a bias voltage VBIAS. The first power line PL1 may receive a first voltage ELVDD, and the second power line PL2 may receive a second voltage ELVSS The first to seventh transistors T1 to T8 may include a source electrode, a drain electrode, and a gate electrode. Hereinafter, as illustrated in FIG. 5, any one of the source electrode and the drain electrode is defined as the first electrode, and another one of the source electrode and the drain electrode is defined as the second electrode. In addition, the gate electrode is defined as a control electrode.

The transistors T1 to T8 may include first to eighth transistors T1 to T8. The first and second transistors T1 and T2, and the fifth to eighth transistors T5 to T8 may be PMOS transistors. The third and fourth transistors T3 and T4 may be NMOS transistors.

The-first transistor T1 may be defined as a driving transistor, and the second transistor T2 may be defined as a switching transistor. The third transistor T3 may be defined as a compensating transistor. The fourth transistor T4 and the seventh transistor T7 may be defined as initializing transistors. The fifth transistor T5 and the sixth transistor T6 may be defined as light emitting control transistors. The eighth transistor T8 may be defined as a bias transistor.

The light emitting element OLED may be defined as an organic light emitting device. The light emitting element OLED may include an anode AE and a cathode CE. The anode AE may receive the first voltage ELVDD through the sixth, first, and fifth transistors T6, T1, and T5. The first voltage ELVDD may be applied to the pixel circuit PC through the first power line PL1. The cathode CE may receive the second voltage ELVSS having a level lower than the first voltage ELVDD. The second voltage ELVSS may be applied to the pixel circuit PC through the second power line PL2.

The first transistor T1 may be interposed between the fifth transistor T5 and the sixth transistor T6, and may be connected to the fifth transistor T5 and the sixth transistor T6. The first transistor T1 may be connected to the first power line PL1 through the fifth transistor T5, and may be connected to the anode AE through the sixth transistor T6.

The first transistor T1 may include a first electrode connected to the first power line PL1 through the fifth transistor T5, a second electrode connected to the anode AE through the sixth transistor T6, and a control electrode connected to the first node N1.

The first electrode of the first transistor T1 may be connected to the fifth transistor T5, and the second electrode of the first transistor T1 may be connected to the sixth transistor T6. The first transistor T1 may control an amount of current flowing through the light emitting element OLED based on the voltage of the first node N1 applied to the control electrode of the first transistor T1.

The second transistor T2 may be interposed between the first transistor T1 and the j-th data line DLj to be connected to the first transistor T1 and the j-th data line DLj. The second transistor T2 may include a first electrode connected to the j-th data line DLj, a second electrode connected to the first electrode of the first transistor T1, and a control electrode connected to the i-th write scan line GWi.

The second transistor T2 may be turned on by the i-th write scan signal GWSi applied through the i-th write scan line GWi to electrically connect the j-th data line DLj to the first electrode of the first transistor T1. The second transistor T2 may perform a switching operation of providing a data voltage VD applied through the j-th data line DLj to the first electrode of the first transistor T1.

The third transistor T3 may be connected to the second electrode of the first transistor T1 and the first node N1. The third transistor T3 may include a first electrode connected to the second electrode of the first transistor T1, a second electrode connected to the first node N1, and a control electrode connected to the i-th compensating scan line GCi.

The third transistor T3 may be turned on by the i-th compensating scan signal GCSi applied through the i-th compensating scan line GCi to electrically connect the second electrode of the first transistor T1 and the control electrode of the first transistor T1. When the third transistor T3 is turned on, the first transistor T1 may be connected in the form of diodes.

The fourth transistor T4 may be connected to the first node N1. The fourth transistor T4 may include a first electrode connected to the first node N1, a second electrode connected to the first initializing line VIL1, and a control electrode connected to the i-th initializing scan line GIl. The fourth transistor T4 may be turned on by the i-th initializing scan signal GISi applied through the i-th initializing scan line GII and may provide the first initializing voltage VINT applied through the first initializing line VIL1 to the first node N1.

The fifth transistor T5 may include a first electrode connected to the first power line PL1, a second electrode connected to the first electrode of the first transistor T1, and a control electrode connected to the i-th light emitting line ELi.

The sixth transistor T6 may include a first electrode connected to the second electrode of the first transistor T1, a second electrode connected to the anode AE, and a control electrode connected to the i-th light emitting line ELi.

The fifth transistor T5 and the sixth transistor T6 may be turned on by the i-th light emitting signal ESi applied through the i-th light emitting line ELi. The first voltage ELVDD is provided to the light emitting element OLED by the fifth transistor T5 and the sixth transistor T6, which are turned on, such that a driving current may flow through the light emitting element OLED. Accordingly, the light emitting element OLED may emit light.

The seventh transistor T7 may include a first electrode connected to the anode AE, a second electrode connected to the second initializing line VIL2, and a control electrode connected to the i-th bias scan line GBi. The seventh transistor T7 may be turned on in response to the i-th bias scan signal GBSi received through the i-th bias scan line GBI, such that the second initializing voltage AINT received through the second initializing line VIL2 is provided to the anode AE of the light emitting element OLED.

According to some embodiments of the present disclosure, the seventh transistor T7 may be omitted. According to some embodiments of the present disclosure, the second initializing voltage AINT may have a level different from the level of the first initializing voltage VINT, but the present disclosure is not limited thereto. For example, the second initializing voltage AINT may have the same level as the first initializing voltage VINT.

The seventh transistor T7 may relatively improve the black expression ability of the pixel PX. When the seventh transistor T7 is turned on, a parasitic capacitor of the light emitting element OLED may be discharged. Accordingly, when implementing the brightness of black, the light emitting element OLED does not emit light due to the leakage current of the first transistor T1. Accordingly, the black expression ability may be relatively improved.

The capacitor CST may include a first electrode connected to the first power line PL1 and a second electrode connected to the first node N1. When the fifth transistor T5 and the sixth transistor T6 are turned on, an amount of current flowing through the first transistor T1 may be determined based on a voltage stored in the capacitor CST.

The eighth transistor T8 may include a first electrode connected to the bias line VBL, a second electrode connected to the first electrode of the first transistor T1, and a control electrode connected to the i-th bias scan line GBi. According to some embodiments of the present disclosure, the eighth transistor T8 may be omitted.

The eighth transistor T8 may be turned on by the i-th bias scan signal GBSi, and may provide the bias voltage VBIAS to the first electrode of the first transistor T1. When the bias voltage VBIAS is applied to the first transistor T1, the shift of the hysteresis curve of the first transistor T1 may be suppressed.

The sensor SNij may include a sensing circuit SNC and a light receiving element LRE connected to the sensing circuit SNC. The sensing circuit SNC may drive the light receiving element LRE.

The sensor SNij may be connected to the i-th reset scan line GRi, a reset line VRL, the second initializing line VIL2, the i-th write scan line GWi, the j-th receive line RXj, and the second power line PL2.

The sensing circuit SNC may be connected to the i-th reset scan line GRi, the reset line VRL, the second initializing line VIL2, the i-th write scan line GWi, and the j-th receive line RXj. The light receiving element LRE may be connected to the second power line PL2.

The sensing circuit SNC may include a first transistor T1', a second transistor T2', and a third transistor T3'. The first and third transistors T1' and T3' may be PMOS transistors, and the second transistor T2' may be an NMOS transistor.

The light receiving element LRE may be defined as a photodiode. The light receiving element LRE may convert light energy incident from the outside into electrical energy. The light receiving element LRE may include an anode AE' and a cathode CE'. The anode AE' may be connected to a second node N2, and the cathode CE' may be connected to the second power line PL2.

The first transistor T1' may be connected to the light receiving element LRE, the second transistor T2', and the third transistor T3'. The first transistor T1' may include a first electrode receiving the second initializing voltage AINT, a control electrode connected to the second node N2, and a second electrode connected to the third transistor T3'. A first electrode of the first transistor T1' may be connected to a second initialization line VIL2 to receive the second initializing voltage AINT.

The second transistor T2' may include a first electrode connected to the second node N2, a control electrode connected to the i-th reset scan line GRi, and a second electrode connected to the reset line VRL receiving a reset voltage VRST.

The third transistor T3' may include a first electrode connected to the second electrode of the first transistor T1', a control electrode connected to the i-th write scan line GWi, and a second electrode connected to the receive line RXj. The third transistor T3' may be turned on by the i-th write scan signal GWSi received through the i-th write scan line GWi.

The second transistor T2' may be turned on by the i-th reset scan signal GRSi received through the i-th reset scan line GRi. The turned-on second transistor T2' may receive the reset voltage VRST and provide the same to the second node N2. The second node N2 may be reset by the reset voltage VRST.'

The i-th write scan signal GWSi may be applied to the control electrode of the third transistor T3' such that the third transistor T3' may be turned on. The first transistor T1' may be connected to the receive line RXj by the turned-on third transistor T3'.

The light receiving element LRE receives light and converts the light into an electric signal. In this case, the voltage of the second node N2 may be changed. When the first transistor T1' is turned on, the second initializing voltage AINT provided to the first transistor T1' may be controlled depending on a change in voltage of the second node N2, and may be provided to the receive line RXj through the third transistor T3'. Accordingly, a signal sensed by the light receiving element LRE may be outputted through a receive line RXj as a sensing signal RS.

Figure 6:
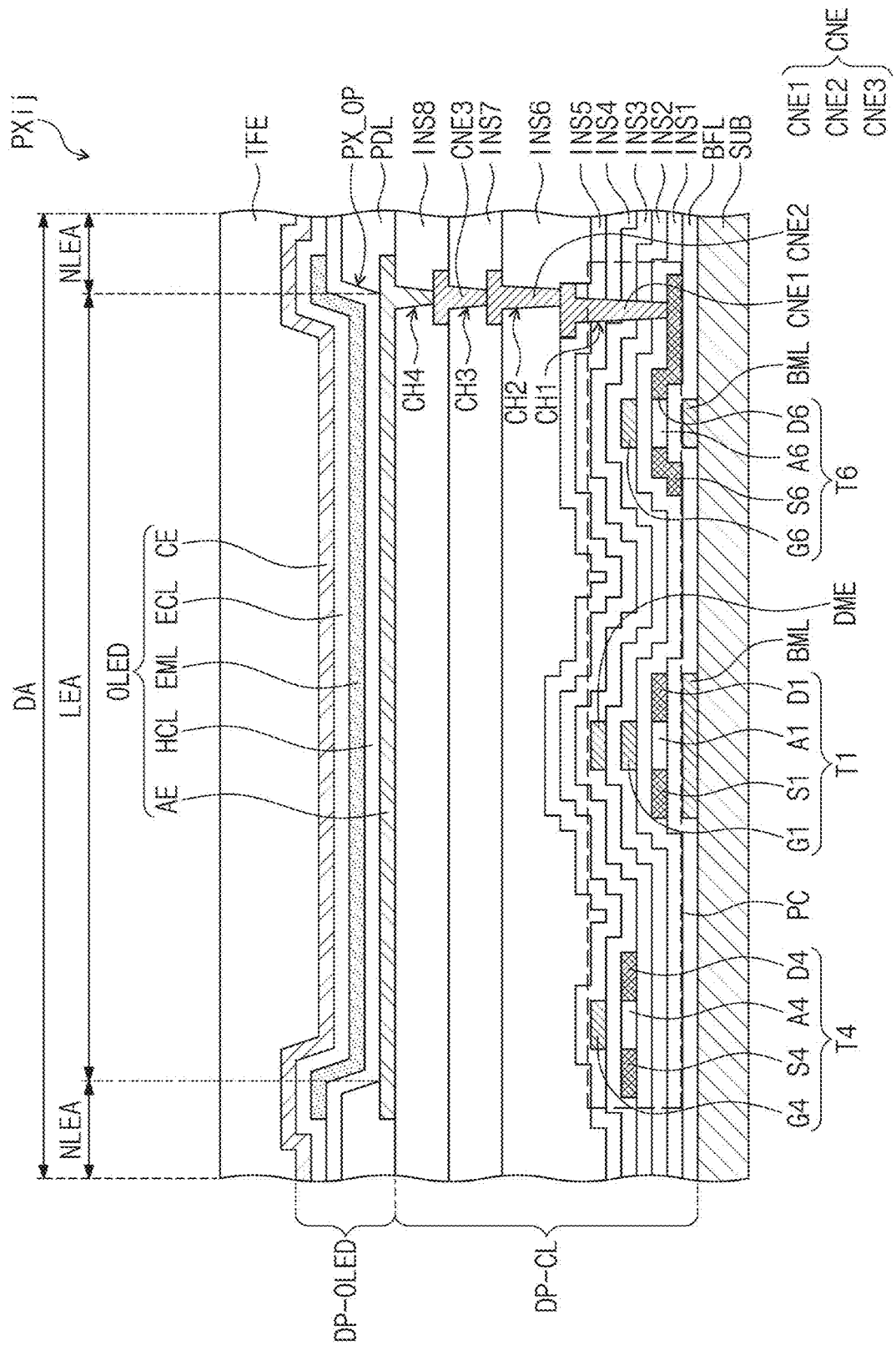
FIG. 6 is a cross-sectional view illustrating a light emitting element, a first transistor, a fourth transistor, and a sixth transistor of a pixel illustrated in FIG. 5.

FIG. 6 is a cross-sectional view illustrating a light emitting element, a first transistor, a fourth transistor, and a sixth transistor of a pixel illustrated in FIG. 5.

Referring to FIG. 6, the light emitting element OLED may include a first electrode AE (or anode), a second electrode CE (or cathode), a hole control layer HCL, an electron control layer ECL, and a light emitting layer EML. The first electrode AE may be an anode electrode illustrated in FIG. 5, and the second electrode CE may be a cathode electrode illustrated in FIG. 5. The second electrode CE may be located on the first electrode AE, and the hole control layer HCL, the electron control layer ECL, and the light emitting layer EML may be interposed between the first electrode AE and the second electrode CE.

The first, fourth, and sixth transistors T1, T4, T6 and the light emitting element OLED may be located on the substrate SUB. The display region DA may include a light emitting region LEA corresponding to the pixel PXij and a non-light emitting region NLEA adjacent to the light emitting region LEA. The light emitting element OLED may be located in the light emitting region LEA.

A lower metal layer BML may be located on the substrate SUB. For example, the lower metal layer BML located under the first and sixth transistors T1 and T6 is illustrated. The lower metal layer BML may be located under the pixel circuit PC. For example, the lower metal layer BML may overlap the first transistor T1 and may be located under the first transistor T1. In addition, the lower metal layer BML may overlap the sixth transistor T6 and may be located under the sixth transistor T6.

According to some embodiments, the lower metal layer BML may receive a constant voltage. When a constant voltage is applied to the lower metal layer BML, the value of a threshold voltage Vth of the first transistor T1 located on the lower metal layer BML may be maintained without changing.

The lower metal layer BML may block light incident to the first transistor T1 from a lower portion of the lower metal layer BML. For example, the lower metal layer BML may include a reflective metal. For example, the lower metal layer BML may be omitted.

A buffer layer BFL may be located on the substrate SUB. The buffer layer BFL may be an inorganic layer. The buffer layer BFL may cover the lower metal layer BML. The semiconductor layers S1, A1, and D1 of the first transistor T1 and the semiconductor layers S6, A6, and D6 of the sixth transistor T6 may be located on the buffer layer BFL. The semiconductor layers S1, A1, D1, S6, A6, and D6 may include polysilicon. However, the semiconductor layers S1, A1, D1, S6, A6, and D6 may include amorphous silicon.

The semiconductor layers S1, A1, D1, S6, A6, and D6 may be doped with an N-type dopant or a P-type dopant. The semiconductor layers S1, A1, D1, S6, A6, and D6 may include a heavily-doped region and a lightly-doped region. The conductivity of the heavily-doped region is greater than that of the lightly-doped region, and may substantially serve as a source electrode and a drain electrode of the first and sixth transistors T1 and T6. The lightly-doped region may substantially correspond to active (or channel) of the first and sixth transistors T1 and T6.

The first source region S1, the first channel region A1, and the first drain region D1 of the first transistor T1 may be formed from the semiconductor layers S1, A1, and D1 of the first transistor T1. The sixth source region S6, the sixth channel region A6, and the sixth drain region D6 of the sixth transistor T6 may be formed from the semiconductor layers S6, A6, and D6. The first channel region A1 may be interposed between the first source region S1 and the first drain region D1. The sixth channel region A6 may be interposed between the sixth source region S6 and the sixth drain region D6.

The lower metal layer BML may overlap the semiconductor layers S1, A1, and D1 of the first transistor T1, and may be located under the semiconductor layers S1, A1, and D1. In addition, the lower metal layer BML may overlap a sixth channel region A6 of the sixth transistor T6 and may be located under the sixth transistor A6.

A first insulating layer INS1 may be located on the buffer layer BFL to cover the semiconductor layers S1, A1, D1, S6, A6, and D6. The first and sixth gate electrodes G1 and G6 (or control electrodes) of the first and sixth transistors T1 and T6 may be located on the first insulating layer INS1.

According to some embodiments, the structure of the source region, the channel region, the drain region, and the gate electrode of each of the second, fifth, seventh, and eighth transistors T2, T5, T7, and T8 may be substantially the same as that of the first and sixth transistors T1 and T6.

A second insulating layer INS2 may be located on the first insulating layer INS1 to cover the first and sixth gate electrodes G1 and G6. A dummy electrode DME may be located on the second insulating layer INS2. The dummy electrode DME may be located on the first gate electrode G1 and may overlap the first gate electrode G1 when viewed in a plan view. The dummy electrode DME may form the capacitor CST described above together with the first gate electrode G1.

A third insulating layer INS3 may be located on the second insulating layer INS2 to cover the dummy electrode DME. The semiconductor layers S4, A4, and D4 of the fourth transistor T4 may be located on the third insulating layer INS3. The semiconductor layers S4, A4, and D4 may include an oxide semiconductor formed of a metal oxide. The oxide semiconductor may include a crystalline or amorphous oxide semiconductor.

The semiconductor layers S4, A4, and D4 may include a plurality of regions classified depending on whether the metal oxide is relatively reduced. The region (hereinafter, referred to as a reduction region), in which the metal oxide is relatively reduced, has higher conductivity than the region (hereinafter, referred to as a non-reduction region) in which the metal oxide is not reduced. The reduction region may serve as a source electrode or a drain electrode of the fourth transistor T4. The non-reduction region may substantially correspond to an active (or a channel) of a fourth transistor T4.

The fourth source region S4, the fourth channel region A4, and the fourth drain region D4 of the fourth transistor T4 may be formed from the semiconductor layers S4, A4, and D4. The fourth channel region A4 may be interposed between the fourth source region S4 and the fourth drain region D4.

A fourth insulating layer INS4 may be located on the third insulating layer BFL to cover the semiconductor layers S1, S4, A4, D4, A6, and D6. The fourth gate G4 of the fourth transistor T4 may be located on the fourth insulating layer INS4.

A fifth insulating layer INS5 may be located on the fourth insulating layer INS4 to cover the fourth gate electrode G4. The buffer layer BFL and the first to fifth insulating layers INS1 to INS5 may include inorganic layers. According to some embodiments, the structure of the source region, a channel region, a drain region, and a gate electrode of the third transistor T3 may be substantially the same as that of the fourth transistor T4.

A connection electrode CNE may be interposed between the sixth transistor T6 and the light emitting element OLED. The connection electrode CNE may electrically connect the sixth transistor T6 and the light emitting element OLED.

The connection electrode CNE may include a first connection electrode CNE1, a second connection electrode CNE2 located on the first connection electrode CNE1, and a third connection electrode CNE3 located on the second connection electrode CNE2.

The first connection electrode CNE1 is located on the fifth insulating layer INS5, and may be connected to the sixth drain region D6 through a first contact hole CH1 defined in the first to fifth insulating layers INS1 to INS5. A sixth insulating layer INS6 may be located on the fifth insulating layer INS5 to cover the first connection electrode CNE1.

The second connection electrode CNE2 may be located on the sixth insulating layer INS6. The second connection electrode CNE2 may be connected to the first connection electrode CNE1 through a second contact hole CH2 defined in the sixth insulating layer INS6. A seventh insulating layer INS7 may be located on the sixth insulating layer INS6 to cover the second connection electrode CNE2.

The third connection electrode CNE3 may be located on the seventh insulating layer INS7. The third connection electrode CNE3 may be connected to the second connection electrode CNE2 through a third contact hole CH3 defined in the seventh insulating layer INS7. An eighth insulating layer INS8 may be located on the seventh insulating layer INS7 to cover the third connection electrode CNE3. The sixth to eighth insulating layers INS6 to INS8 may include an inorganic layer or an organic layer.

The first electrode AE may be located on the eighth insulating layer INS8. The first electrode AE may be electrically connected to the third connection electrode CNE3 through a fourth contact hole CH4 defined in the eighth insulating layer INS8.

A pixel defining layer PDL exposing a specific portion of the first electrode AE may be located on the first electrode AE and the eighth insulating layer INS8. An opening PX_OP for exposing the specific portion of the first electrode AE may be defined in the pixel defining layer PDL.

The hole control layer HCL may be located on the first electrode AE and the pixel defining layer PDL. The hole control layer HCL may be located in common in the light emitting region LEA and the non-light emitting region NLEA. The hole control layer HCL may include a hole transport layer and a hole injection layer.

The light emitting layer EML may be located on the hole control layer HCL. The light emitting layer EML may be located in an area corresponding to the opening PX_OP. The light emitting layer EML may include an organic material and/or an inorganic material. The light emitting layer EML may generate any one of red, green, and blue light.

The electron control layer ECL may be located on the light emitting layer EML and the hole control layer HCL. The electron control layer ECL may be located in common in the light emitting region LEA and the non-light emitting region NLEA. The electron control layer ECL may include an electron transport layer and an electron injection layer.

The second electrode CE may be located on the electron control layer ECL. The second electrode CE may be located in the pixels PX in common. In other words, the second electrode CE may be located on the light emitting layers EML of the pixels PX in common.

Layers including the buffer layer BFL to the eighth insulating layer INS8 may be defined as the circuit element layer DP-CL. The layer in which the light emitting element OLED is located may be defined as the display element layer DP-OLED.

The thin film encapsulating layer TFE may be located on the light emitting element OLED. The thin film encapsulating layer TFE may include an inorganic layer, an organic layer, and an inorganic layer sequentially stacked. The inorganic layers may include an inorganic material to protect pixels from moisture/oxygen. The organic layer may include an organic material to protect pixels PX from foreign substances such as dust particles.

The first voltage ELVDD may be applied to the first electrode AE, and the second voltage ELVSS may be applied to the second electrode CE. Holes and electrons injected into the light emitting layer EML are combined to form excitons, and the light emitting element OLED may emit light as the excitons transition to the ground state. The light emitting element OLED may emit light, and an image may be displayed.

Figure 7:
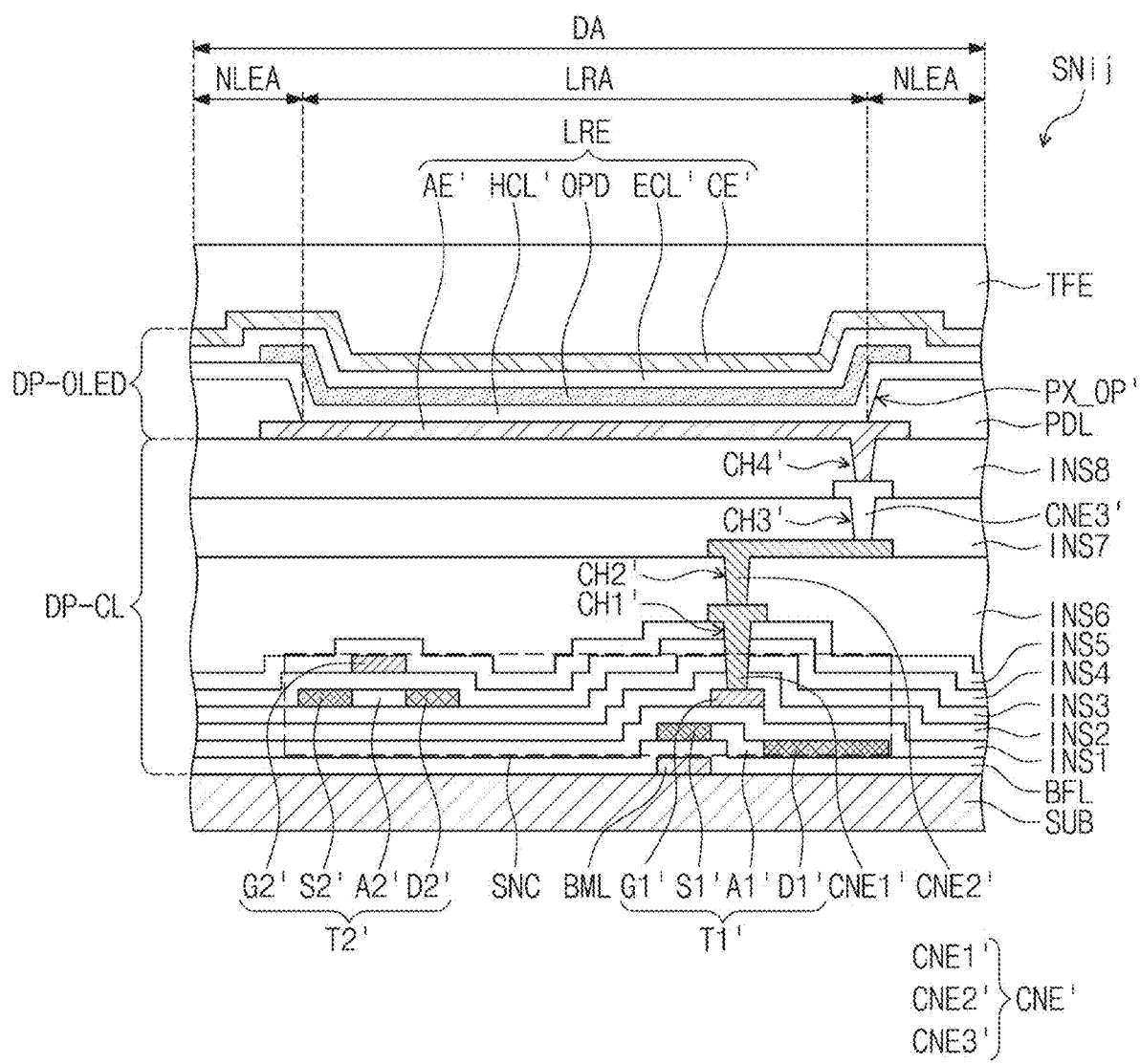
FIG. 7 is a cross-sectional view illustrating a light receiving element, a first transistor, and a second transistor of a sensor illustrated in FIG. 5.

FIG. 7 is a cross-sectional view illustrating a light receiving element, a first transistor, and a second transistor of a sensor illustrated in FIG. 5.

Hereinafter, the components illustrated in FIG. 7 will be described while focusing on a structure different from the stack structure illustrated in FIG. 6.

Referring to FIG. 7, the display region DA may include a light receiving region LRA corresponding to the sensor SNij and a non-light emitting region NLEA adjacent to the light receiving region LRA. The non-light emitting region NLEA may be the non-light emitting region NLEA illustrated in FIG. 6.

The light receiving element LRE may include a first electrode AE', a second electrode CE', a hole control layer HCL', an electron control layer ECL', and a light receiving layer OPD. The first electrode AE' may be the anode AE' illustrated in FIG. 5, and the second electrode CE' may be the cathode CE' illustrated in FIG. 5. The light receiving layer OPD may be defined as an organic photodiode. The first electrode AE', the second electrode CE', the hole control layer HCL', and the electron control layer ECL' may be substantially the same components as the first electrode AE, the second electrode CE, the hole control layer HCL, and the electron control layer ECL illustrated in FIG. 6.

The position for the light receiving layer OPD in FIG. 7 may correspond to a position for the light emitting layer EML in FIG. 6. In other words, the second electrode CE' is located on the first electrode AE', and the hole control layer HCL', the electron control layer ECL', and the light receiving layer OPD may be located between the first electrode AE' and the second electrode CE'. The second electrode CE' may be commonly located on the light receiving layers OPD of the light receiving elements LRE. The second electrode CE' may be integrally formed with the second electrode CE illustrated in FIG. 6.

The receive line RX may be located on the substrate SUB. The receive line RX may be any one of the receive lines RX1 to RXh illustrate in FIG. 4. The buffer layer BFL may be located on the substrate SUB to cover the receive line RX. The first transistor T1' may be located on the buffer layer BFL. The receive line RX may be located under the sensing circuit SNC. For example, the receive line RX may be located under the first transistor T1' to overlap the first transistor T1'.

The receive line RX may be located on the same layer as the lower metal layer BML shown in FIG. 6. The receive line RX may be formed by simultaneously patterning the same material as the lower metal layer BML.

The first transistor T1' may include a first source region S1', a first drain region D1', a first channel region A1', and a first gate electrode G1'. The second transistor T2' may include a second source region S2', a second drain region D2', a second channel region A2', and a second gate electrode G2'. The receive line RX may be located under the first source region S1' to overlap the first source region S1'.

A stack structure of the first transistor T1' may be substantially the same as the stack structure of the first transistor T1 illustrated in FIG. 6. The stack structure of the second transistor T2' may be substantially the same as the stack structure of the fourth transistor T4 illustrated in FIG. 6. According to some embodiments, the stack structure of the third transistor T3' may be substantially the same as that of the first transistor T1'.

A connection electrode CNE' may include a first connection electrode CNE1', a second connection electrode CNE2', and a third connection electrode CNE3'. The first connection electrode CNE1' may be located in the same layer as the first connection electrode CNE1 illustrated in FIG. 6, the second connection electrode CNE2' may be located in the same layer as the second connection electrode CNE2 illustrated in FIG. 6, and the third connection electrode CNE3' may be located in the same layer as the third connection electrode CNE3 illustrated in FIG. 6.

The first connection electrode CNE1' may be connected to the first gate electrode G1' of the first transistor T1' through a first contact hole CH1' defined in the second to fifth insulating layers INS2 to INS5. The second connection electrode CNE2' may be connected to the first connection electrode CNE1' through a second contact hole CH2' defined in the sixth insulating layer INS6.

The third connection electrode CNE3' may be connected to the second connection electrode CNE2' through a third contact hole CH3' defined in the seventh insulating layer INS7. The first electrode AE' may be connected to the third connection electrode CNE3' through a fourth contact hole CH4' defined in the eighth insulating layer INS8.

Figure 8:
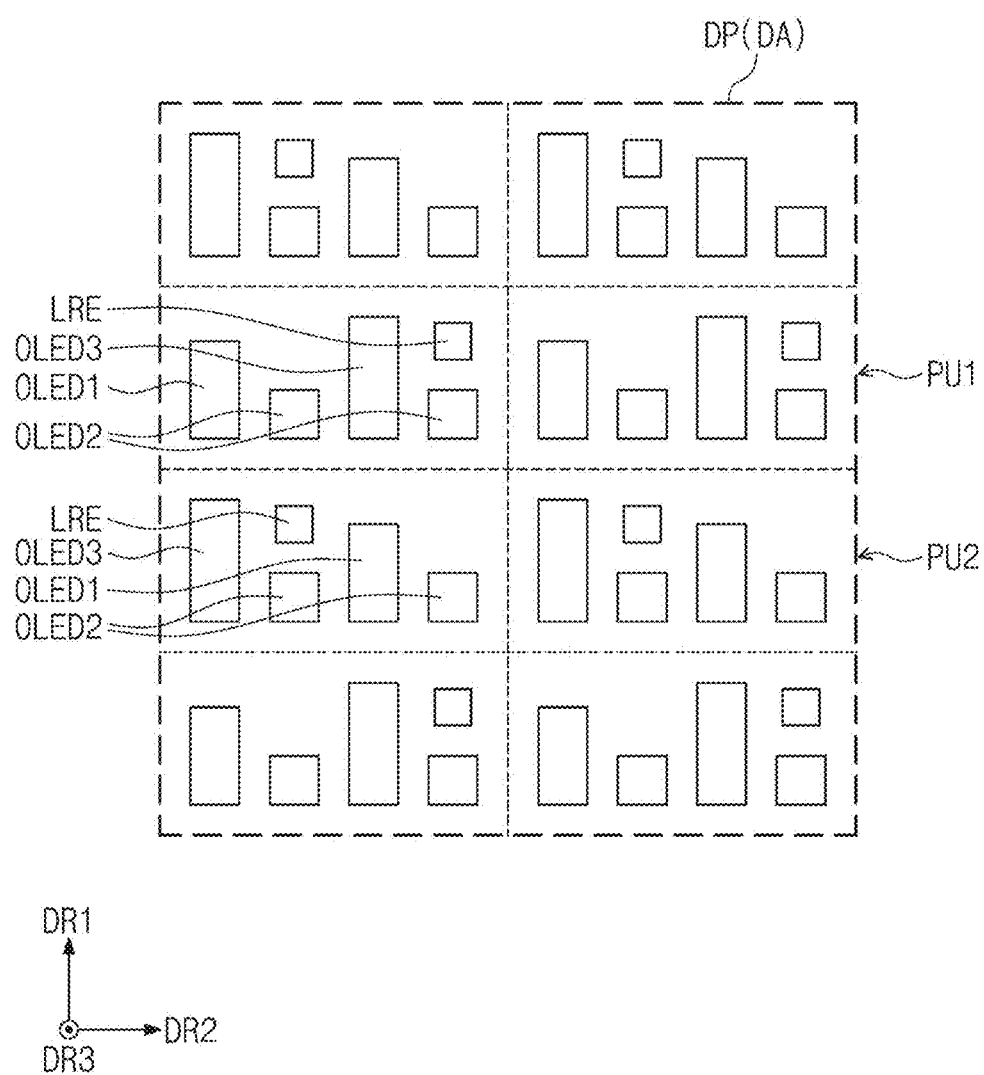
FIG. 8 is a plan view illustrating an arrangement state of light emitting elements and light receiving elements in a partial region of a display region illustrated in FIG. 4.

FIG. 8 is a plan view illustrating an arrangement state of light emitting elements and light receiving elements located in a partial region of a display region illustrated in FIG. 4.

Referring to FIG. 8, each of first, second, and third light emitting elements OLED1, OLED2, and OLED3 may correspond to the light emitting elements OLED illustrated in FIGS. 5 and 6. Each of the light receiving elements LRE may correspond to the light receiving elements LRE illustrated in FIGS. 5 and 7. The first light emitting element OLED1 may express a red color. The second light emitting element OLED2 may display a green color. The third light emitting element OLED3 may display a blue color.

The display panel DP may include a plurality of first pixel units PU1 and a plurality of second pixel units PU2. The first pixel units PU1 may be arranged in the second direction DR2. The second pixel units PU2 may be arranged in a second direction DR2 while being adjacent to the first pixel units PU1 in the first direction DR1.

Each of the first pixel units PU1 may include the first light emitting element OLED1, two second light emitting element OLED2, the third light emitting element OLED3, and the light receiving element LRE. In each of the first pixel units PU1, the first, second, and third light emitting elements OLED1, OLED2, and OLED3 may be arranged in the order of the first light emitting element OLED1, the second light emitting element OLED2, and the third light emitting element OLED3, and the second light emitting element OLED2 in the second direction DR2.

In each of the first pixel units PU1, the light receiving element LRE may be adjacent to the third light emitting element OLED3 and the second light emitting element OLED2 which are secondarily arranged. In each of the first pixel units PU1, the light receiving element LRE may be adjacent to the second light emitting element OLED2, which are secondarily arranged, in the first direction DR1.

Each of the second pixel units PU2 may include the first light emitting element OLED1, two second light emitting elements OLED2, the third light emitting element OLED3, and the light receiving element LRE. In each of the second pixel units PU2, the first, second, and third light emitting elements OLED1, OLED2, and OLED3 may be arranged in the order of the third light emitting element OLED3, the second light emitting element OLED2, and the first light emitting element OLED1, the second light emitting element OLED2 in the second direction DR2.

In each of the second pixel units PU2, the light receiving element LRE may be adjacent to the third light emitting element OLED3 and the second light emitting element OLED2 which is first arranged. In each of the second pixel units PU2, the light receiving element LRE may be adjacent to the second light emitting element OLED2 which is first arranged in the first direction DR1.

When viewed in a plan view, in each of the first and second pixel units PU1 and PU2, the area of the first light emitting element OLED1 may be larger than the area of the second light emitting element OLED2, and the area of the third light emitting element OLED3 may be larger than the area of the first light emitting element OLED1. In addition, when viewed in a plan view, the area of the second light emitting element OLED2 in each of the first and second pixel units PU1 and PU2 may be larger than the area of the light receiving element LRE.

When viewed in a plan view, the first, second, and third light emitting elements OLED1, OLED2, and OLED3 and the light receiving element LRE may have a square shape, but the present disclosure is not limited thereto. For example, the first, second, and third light emitting elements OLED1, OLED2, and OLED3 and the light receiving element LRE may have various shapes such as diamond shape and circular shape.

Figure 9:
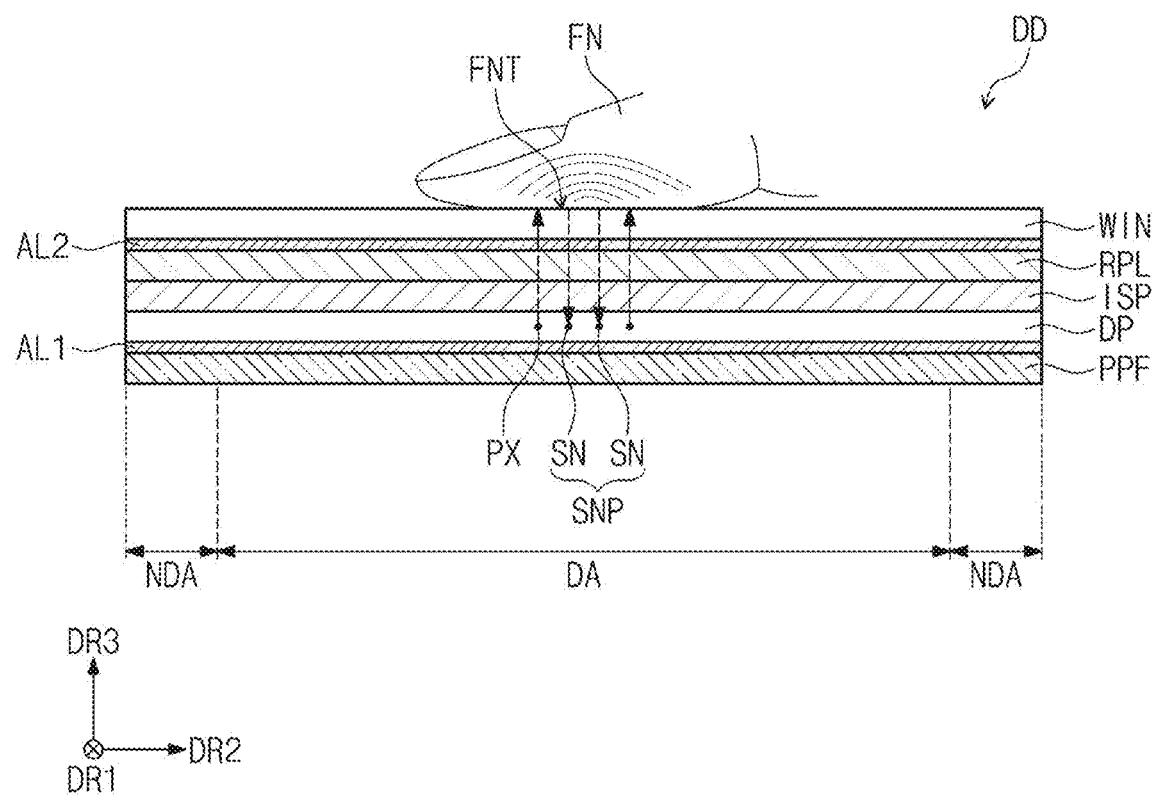
FIG. 9 is a view illustrating the sensing state of a fingerprint by sensors illustrated in FIGS. 5 and 7.

FIG. 9 is a view illustrating a fingerprint sensing state by the sensors illustrated in FIGS. 5 and 7.

Referring to FIG. 9, the display device DD may include a sensing unit SNP embedded in the display panel DP, and the sensing unit SNP may include a plurality of sensors SN. Each of the sensors SN may have the same configuration as the sensor SNij illustrated in FIGS. 5 and 7. For example, although FIG. 9 illustrates two sensors SN, but substantially more many sensors SN may be located in the display panel DP to form the sensing unit SNP.

The sensors SN may sense a fingerprint FNT of a finger FN provided on the display panel DP. Light generated from the light emitting elements OLED of the pixels PX is provided to the fingerprint FNT and may be reflected from the fingerprint FNT.

The light reflected from the fingerprint FNT may be provided to the light receiving elements LRE of the sensors SN to be sensed. The sensors SN may sense the fingerprint FNT through the light reflected from the fingerprint FNT. A control module in the display device DD may receive the information on the fingerprint sensed by the sensors SN and perform a user authentication mode using the received fingerprint information.

FIGS. 10A to 10I are cross-sectional views illustrating the structures of pixel circuits and sensing circuits, when viewed in a plan view.

In FIGS. 10A to 10I, each of the pixel circuits PC may correspond to the pixel circuit PC illustrated in FIG. 5, and each of the sensing circuits SNC may correspond to the sensing circuit SNC illustrated in FIG. 5. For example, FIGS. 10A to 10I may illustrate circuits connected to light emitting elements OLED1, OLED2, and OLED3 and light receiving elements LRE of two adjacent first and second pixel units PU1 and PU2 in the first direction DR1 illustrated in FIG. 8.

When viewed in a plan view, the pixel circuits PC and the sensing circuits SNC may not be arranged to accurately overlap the light emitting elements OLED1, OLED2, and OLED3 and the light receiving elements LRE.

Figure 10A:
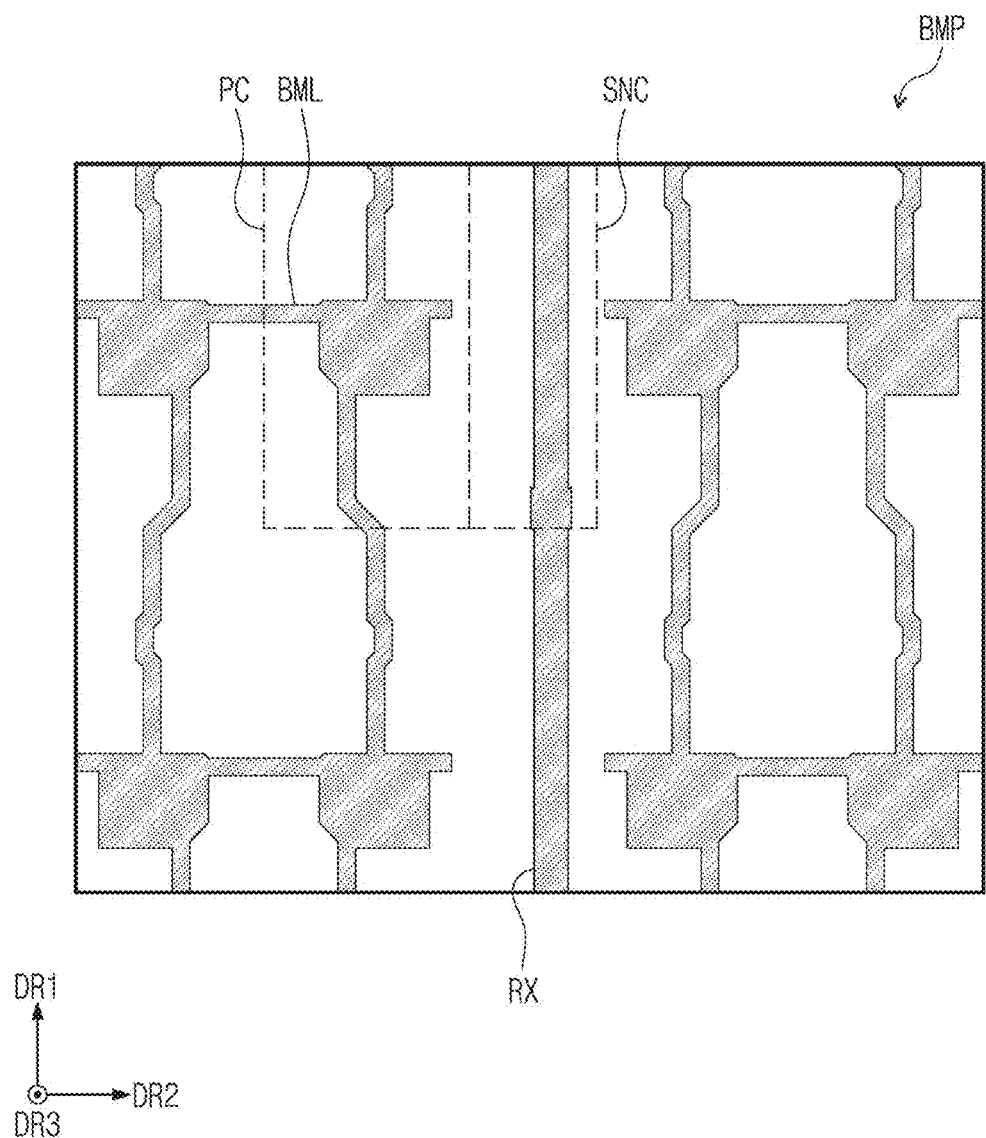
FIGS. 10A to 10I are cross-sectional views illustrating the structures of pixel circuits and sensing circuits, when viewed in a plan view.

For example, in FIG. 10A, the boundary between one pixel circuit PC and one sensing circuit SNC is illustrated as a dotted line, and for convenience of explanation, the reference numerals of the pixel circuit PC and sensing circuit SNC are illustrated only in FIG. 10A. In addition, in FIGS. 10A to 10I, the configuration of one pixel circuit PC and one sensing circuit SNC will be described.

FIGS. 10A to 10I may be defined as a layout diagram of the pixel circuits PC and the sensing circuits SNC. In the following description made with reference to FIGS. 10A to 10I, the wording "overlapping" indicates a state in which components overlap each other when viewed in a plan view. In the drawings related the following description, the wording "i-th" and "j-th" indicating the order of the lines described above are omitted. In other words, the layout of the pixel circuit PC and the sensing circuit SNC will be described without limiting the lines in a specific order.

Referring to FIG. 10A, two pixel circuits PC may be located on the left and right sides of each of the sensing circuits SNC. A lower conductive pattern BMP may be located on the substrate SUB illustrated in FIGS. 6 and 7. The lower metal layer BML may be formed by the lower conductive pattern BMP. The lower metal layer BML may overlap the pixel circuits PC.

The lower conductive pattern BMP is not limited to the shape illustrated in FIG. 10A and may have various shapes. The lower metal layer BML illustrated in FIG. 6 may be formed by the lower conductive pattern BMP.

The receive line RX illustrated in FIG. 7 may be formed by the lower conductive pattern BMP. The receive line RX is located in the same layer as the lower metal layer BML and may be electrically separated from the lower metal layer BML. The receive line RX may extend in the first direction DR1 to overlap the sensing circuits SNC.

Figure 10B:
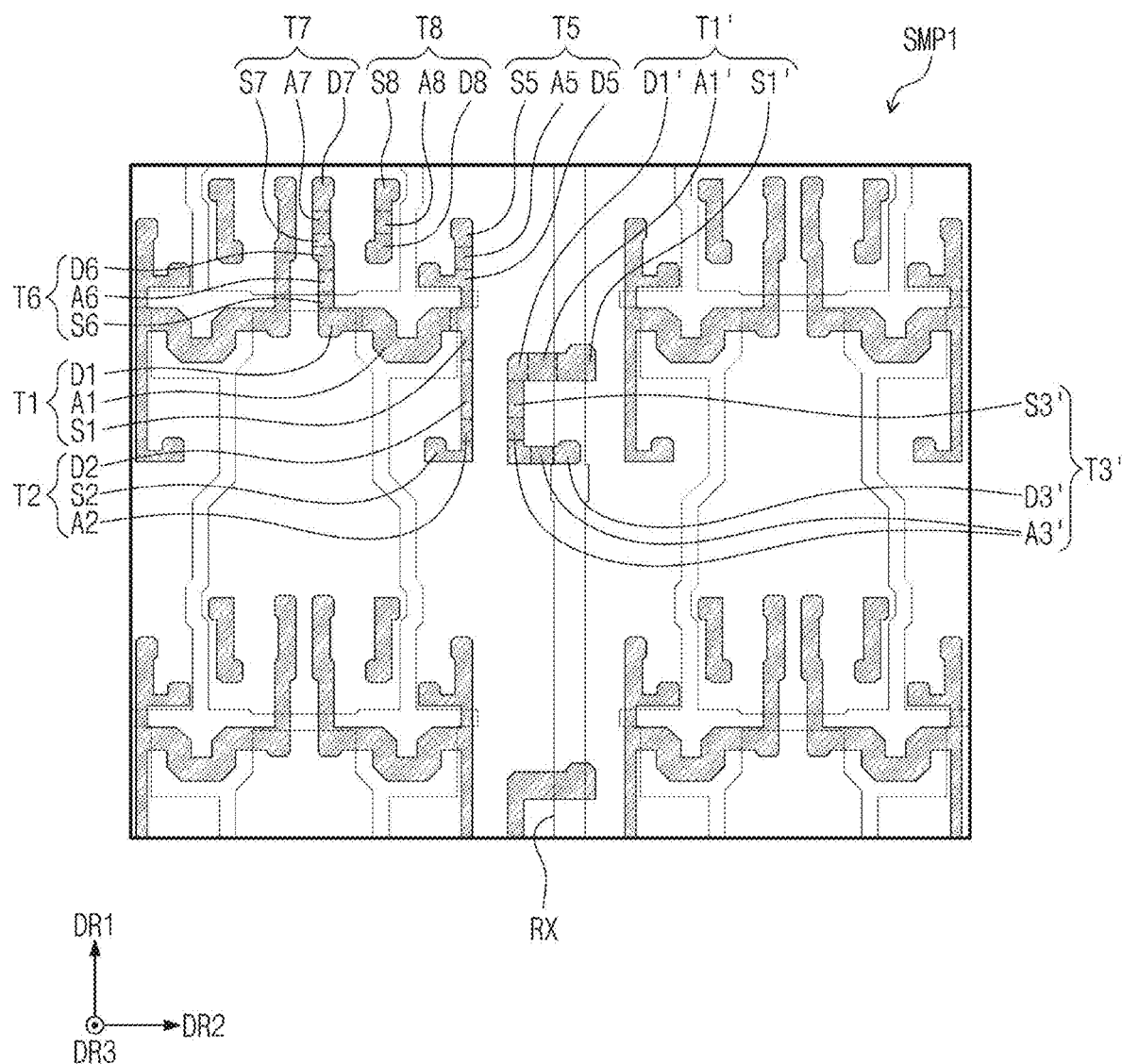

Referring to FIGS. 10A and 10B, a first semiconductor pattern SMP1 may be located on the lower conductive pattern BMP. The first semiconductor pattern SMP1 is not limited to the shape illustrated in FIG. 10B and may have various shapes.

First, second, fifth, sixth, seventh, and eighth source regions S1, S2, S5, S6, S7, and S8, first, second, fifth, sixth, seventh, and eighth drain regions D1, D2, D5, D6, D7, and D8, first, second, fifth, sixth, seventh, and eighth channel regions A1, A2, A5, A6, A7, and A8 of first, second, fifth, sixth, seventh, and eighth transistors T1, T2, T5, T6, T7, and T8 may be formed by the first semiconductor pattern SMP1

Each of the first, second, fifth, sixth, seventh, and eighth channel regions A1, A2, A5, A6, A7, and A8 may be interposed between a relevant one of the first, second, fifth, sixth, seventh, and eighth source regions S1, S2, S5, S6, S7, and S8 and a relevant one of the first, second, fifth, sixth, seventh, and eighth drain regions D1, D2, D5, D6, D7, and D8.

The second drain region D2 of the second transistor T2 and the fifth drain region D5 of the fifth transistor T5 may be formed by extending from the first source region S1 of the first transistor T1. The sixth source region S6 of the sixth transistor T6 may be formed by extending from the first drain region D1 of the first transistor T1. The seventh source region S7 of the seventh transistor T7 may be formed by extending from the sixth drain region D6 of the sixth transistor T6.

According to the above structure, the first transistor T1 may be connected to the second, fifth, and sixth transistors T2, T5, and T6, and the sixth transistor T6 may be connected to the seventh transistor T7.

The first semiconductor pattern SMP1 of the eighth transistor T8 may be interposed between the first semiconductor pattern SMP1 of the fifth transistor T5 and the first semiconductor pattern SMP1 of the seventh transistor T7. The first semiconductor pattern SMP1 of the eighth transistor T8 may be formed in an island shape.

First and third source regions S1' and S3', first and third drain regions D1' and D3', and first and third channel regions A1' and A3' of the first and third transistors T1' and T3' may be formed by the first semiconductor pattern SMP1. Each of the first and third channel regions A1' and A3' may be interposed between each of the first and third source regions S1' and S3' and each of the first and third drain regions D1' and D3', respectively. Two third channel regions A3' may be formed in the third transistor T3'.

The third source region S3' of the third transistor T3' may be formed by extending from the first drain region D1' of the first transistor T1. According to the above structure, the first transistor T1' may be connected to the third transistor T3'.

The first semiconductor pattern SMP1 of the first and third transistors T1' and T3' may be adjacent to the first semiconductor pattern SMP1 of the second transistor T2 in the second direction DR2.

The lower conductive pattern BMP may overlap portions of the first semiconductor patterns SMP1 of the first, fifth, and sixth transistors T1, T5, and T6. The receive line RX may overlap portions of the first semiconductor patterns SMP1 of the first and third transistors T1' and T3'. For example, the receive line RX may overlap the first source region S1' and the third drain region D3'.

Figure 10C:
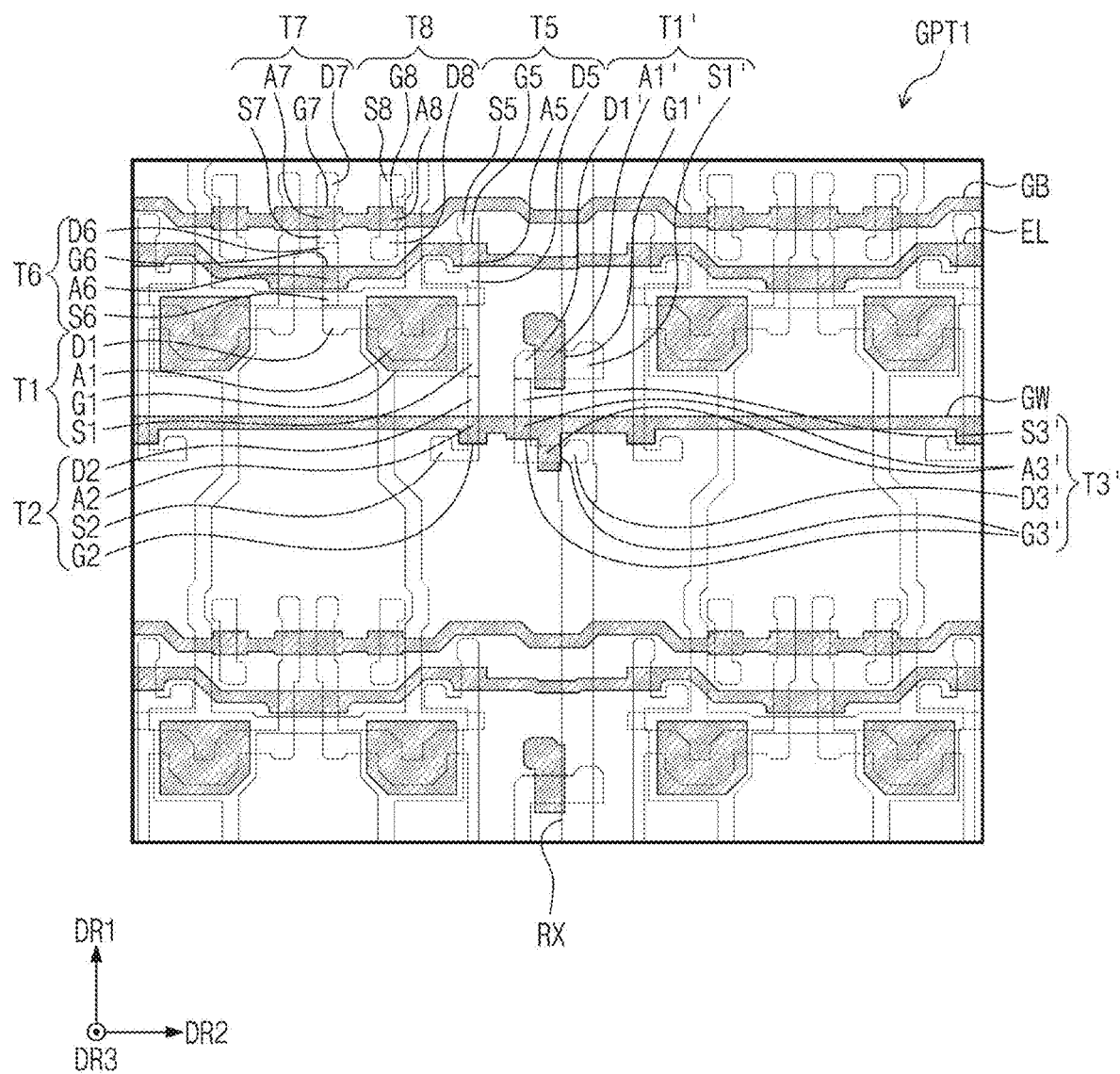

Referring to FIGS. 10A to 10C, a first gate pattern GPT1 may be located on the first semiconductor pattern SMP1. The first gate pattern GPT1 may include a write scan line GW, a light emitting line EL, a bias scan line GB, a first gate electrode G1, and a first gate electrode G1'.

The write scan line GW, the light emitting line EL, and the bias scan line GB may extend in the second direction DR2 and may be arranged in the first direction DR1. The light emitting line EL may be located between the write scan line GW and the bias scan line GB. The first gate electrode G1 and the first gate electrode G1' may be located between the write scan line GW and the light emitting line EL.

The first gate electrode G1 of the first transistor T1 may be formed by the first gate pattern GPT1. The first gate electrode G1 may overlap the first channel region A1.

The write scan line GW may extend to cross the first semiconductor pattern SMP1. The second gate electrode G2 of the second transistor T2 may be formed by the write scan line GW. When viewed in a plan view, a portion of the write scan line GW overlapping the first semiconductor pattern SMP1 may be defined as the second gate electrode G2. When viewed in a plan view, the second gate electrode G2 may overlap the second channel region A2.

The light emitting line EL may extend to cross the first semiconductor pattern SMP1. The fifth gate electrode G5 of the fifth transistor T5 and the sixth gate electrode G6 of the sixth transistor T6 may be formed by the light emitting line EL.

When viewed in a plan view, portions of the light emitting line EL overlapping the first semiconductor pattern SMP1 may be defined as fifth and sixth gate electrodes G5 and G6. When viewed in a plan view, the fifth gate electrode G5 may overlap the fifth channel region A5, and the sixth gate electrode G6 may overlap the sixth channel region A6.

The bias scan line GB may extend to cross the first semiconductor pattern SMP1. The seventh gate electrode G7 of the seventh transistor T7 and the eighth gate electrode G8 of the eighth transistor T8 may be formed by the bias scan line GB. Portions of the bias scan line GB overlapping the first semiconductor pattern SMP1 may be defined as seventh and eighth gate electrodes G7 and G8. The seventh and eighth gate electrodes G7 and G8 may overlap the seventh and eighth channel regions A7 and A8, respectively.

The first gate electrode G1' of the first transistor T1' may be formed by the first gate pattern GPT1. The first gate electrode G1' may overlap the first channel region A1'.

A third gate electrode G3' of the third transistor T3' may be formed by the write scan line GW. When viewed in a plan view, a portion of the write scan line GW overlapping the first semiconductor pattern SMP1 may be defined as the third gate electrode G3'. When viewed in a plan view, the third gate electrode G3' may overlap the third channel region A3'. Two third gate electrode G3' may be formed.

In the following description made with reference FIGS. 10D to 10I, for the convenience for explanation and brief reference numerals, reference numerals of the first, second, and fifth to eighth source regions S1, S2, and S5 to S8, the first, second, and fifth to eighth drain regions D1, D2, and D5 to D8, the first, second, and fifth to eighth channel regions A1, A2, and A5 to A8, and the first, second, and fifth to eighth gate electrodes G1, G2, and G5 to G8 are omitted. In addition, reference numerals of the first and third source regions S1' and S3' and the first and third drain regions D1' and D3', the first and third channel regions A1' and A3', and the first and third gate electrodes G1' and G3' are omitted.

FIG. 10D to 10I illustrate reference numerals for first, second, and fifth to eighth transistors T1, T2, and T5 to T8 and first and third transistors T1' and T3'.

Referring to FIGS. 10A to 10D, a second gate pattern GPT2 may be located on the first gate pattern GPT1. The second gate pattern GPT2 may include the dummy electrode DME and a plurality of sub-dummy electrodes SDE and SDE'.

When viewed in a plan view, the dummy electrode DME may overlap the first gate electrode G1 described above. The dummy electrode DME may form the capacitor CST together with the first gate electrode G1. An opening OP may be defined in the dummy electrode DME.

The sub-dummy electrodes SDE and SDE' may extend in the second direction DR2 and may be arranged in the first direction DR1. When viewed in a plan view, the sub-dummy electrodes SDE may overlap the reset scan line GR, the compensating scan line GC, and the initializing scan line GI, respectively, which is to be illustrated in FIG. 10F.

Referring to FIGS. 10A to 10E, a second semiconductor pattern SMP2 may be located on the second gate pattern GPT2. The third and fourth source regions S3 and S4, the third and fourth drain regions D3 and D4, and the third and fourth channel regions A3 and A4 of the third and fourth transistors T3, T4 may be formed by the second semiconductor pattern SMP2.

The third and fourth channel regions A3 and A4 may be interposed between a relevant one of the third and fourth source regions S3 and S4 and a relevant one of the third and fourth drain regions D3 and D4, respectively. The fourth drain region D4 of the fourth transistor T4 may be formed to extend from the third source region S3 of the third transistor T3. According to the above structure, the fourth transistor T4 may be connected to the third transistor T3.

The second source region S2', the second drain region D2', and the second channel region A2' of the second transistor T2' may be formed by the second semiconductor pattern SMP2. The second channel region A2' may be interposed between the second source region S2' and the second drain region D2'.

Hereinafter, reference numerals of the sub-dummy electrodes SDE and SDE' in FIGS. 10F to 10I are omitted.

Referring to FIGS. 10A to 10F, a third gate pattern GPT3 may be located on the second semiconductor pattern SMP2. The third gate pattern GPT3 may include the compensating scan line GC, the initializing scan line GI, the reset scan line GR, and the second initializing lines VIL2.

The compensating scan line GC, the initializing scan line GI, the reset scan line GR, and the second initializing lines VIL2 may extend in the second direction DR2 and may be arranged in the first direction DR1. The compensating scan line GC, the initializing scan line GI, and the reset scan line GR may be arranged to overlap each of the dummy electrodes SDE illustrated in FIG. 10D.

The compensating scan line GC may extend to cross the second semiconductor pattern SMP2. A third gate electrode G3 of the third transistor T3 may be formed by the compensating scan line GC. When viewed in a plan view, a portion of the compensating scan line GC overlapping the second semiconductor pattern SMP2 may be defined as the third gate electrode G3.

The initializing scan line GI may extend to cross the second semiconductor pattern SMP2. The fourth gate electrode G4 of the fourth transistor T4 may be formed by the initializing scan line GI. When viewed in a plan view, a portion of the initializing scan line GI overlapping the second semiconductor pattern SMP2 may be defined as the fourth gate electrode G4.

The reset scan line GR may extend to cross the second semiconductor pattern SMP2. The second gate electrode G2' of the second transistor T2' may be formed by the reset scan line GR. When viewed in a plan view, the portion of the reset scan line GR overlapping the second semiconductor pattern SMP2 may be defined as the second gate electrode G2'.

The second initializing lines VIL2 may be adjacent to the seventh and eighth transistors T7 and T8 and the first and second transistors T1' and T2'.

In the following description made with reference to FIGS. 10G to 10I, for the convenience of explanation and the brief reference numeral, the reference numerals of the third and fourth source regions S3 and S4, the third and fourth drain regions D3 and D4, the third and fourth channel regions A3 and A4, and the third and fourth gate electrodes G3 and G4 are omitted. In addition, reference numerals of the second source region S2', the second drain region D2', the second channel region A2', and the second gate electrode G2' are omitted.

Figure 10D:
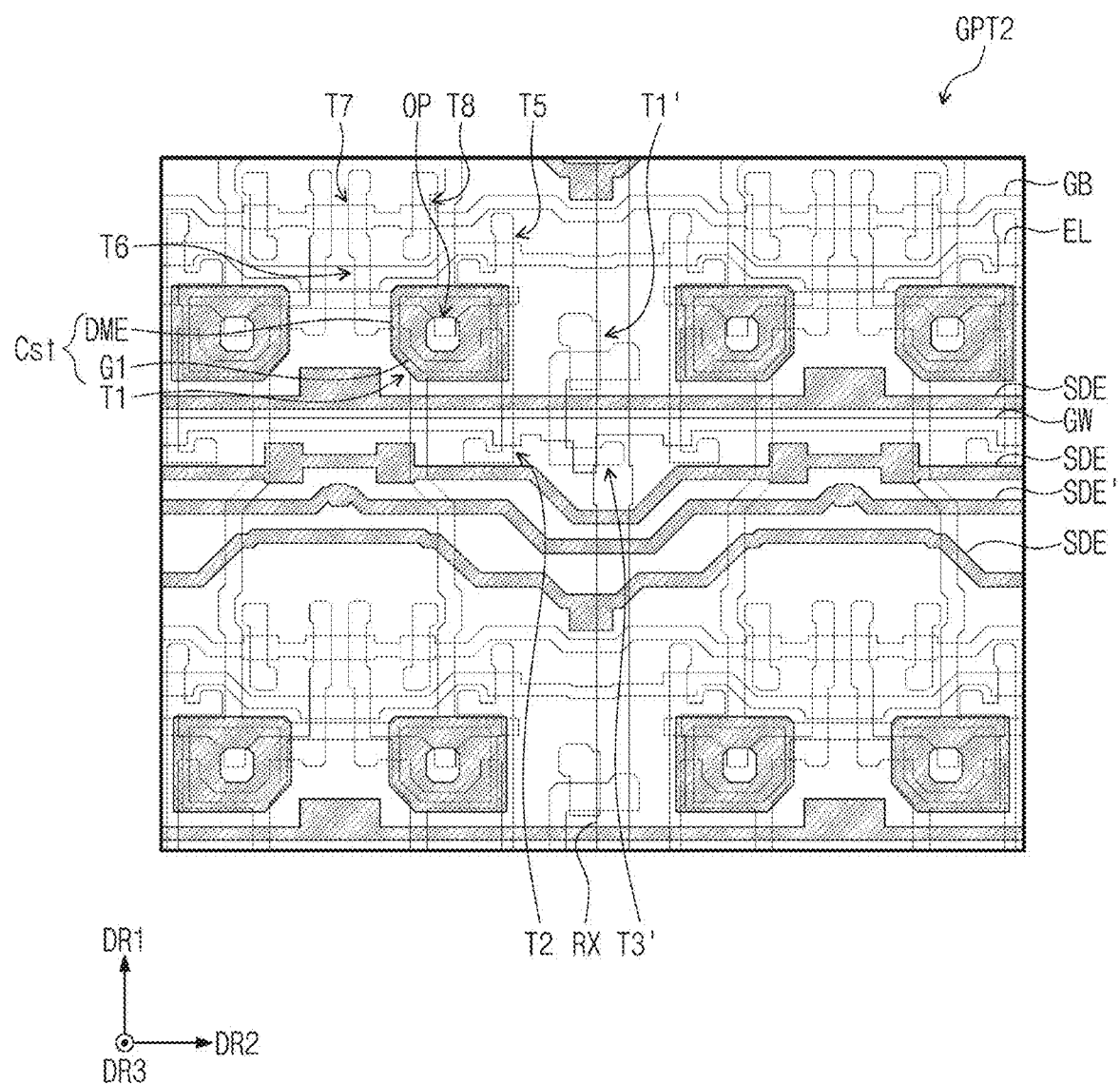
Figure 10E:
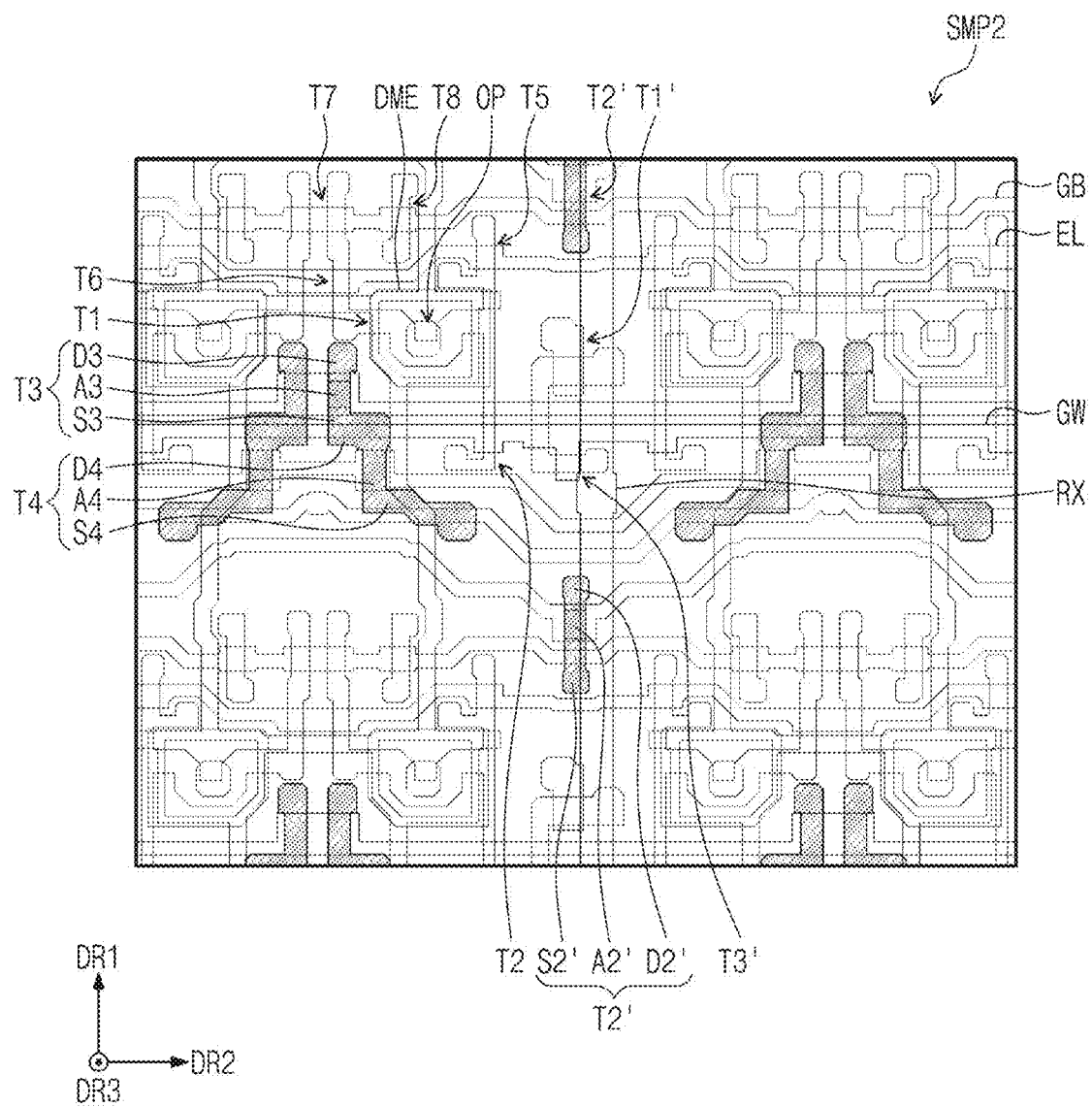
Figure 10F:
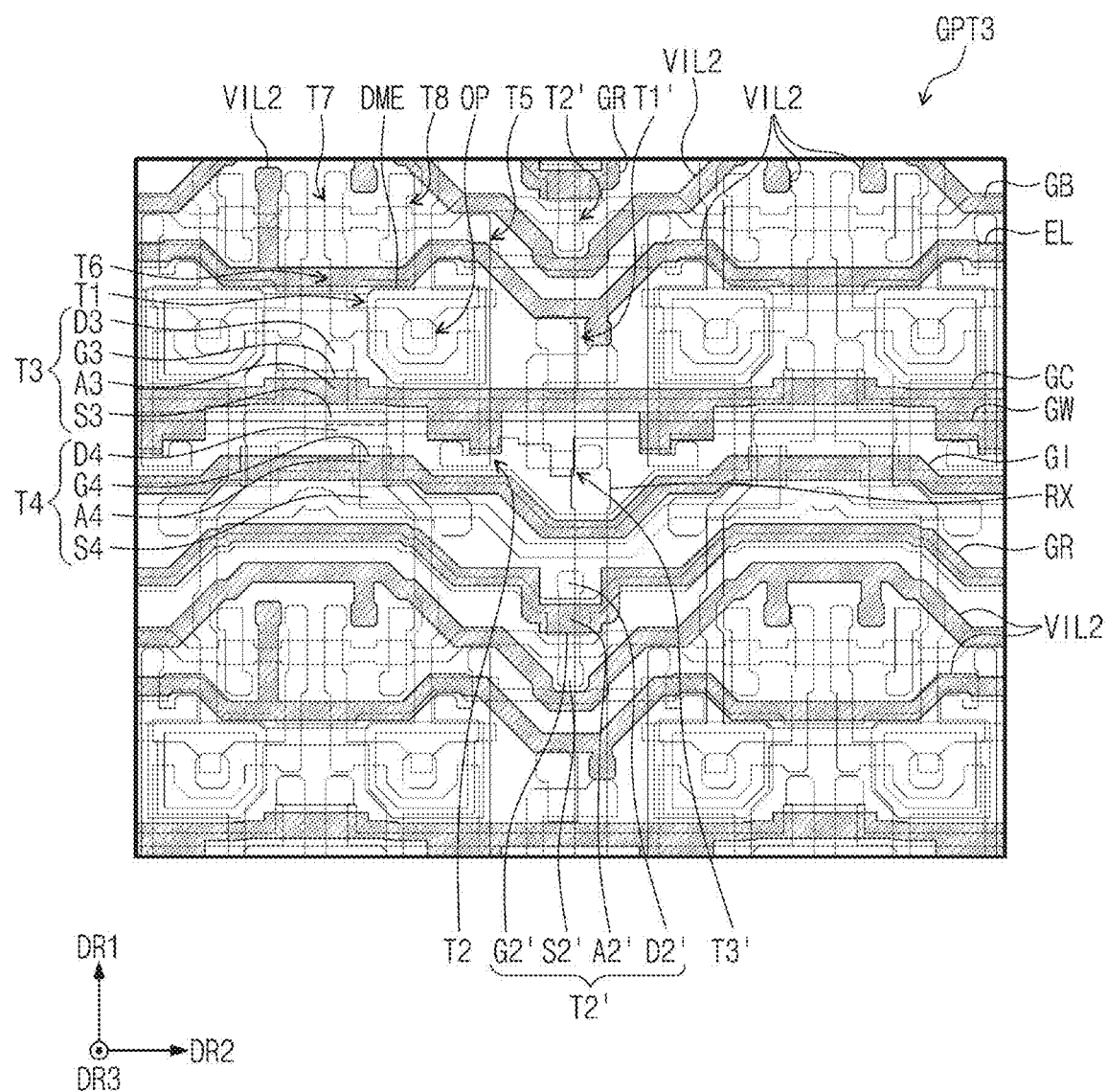
Figure 10G:
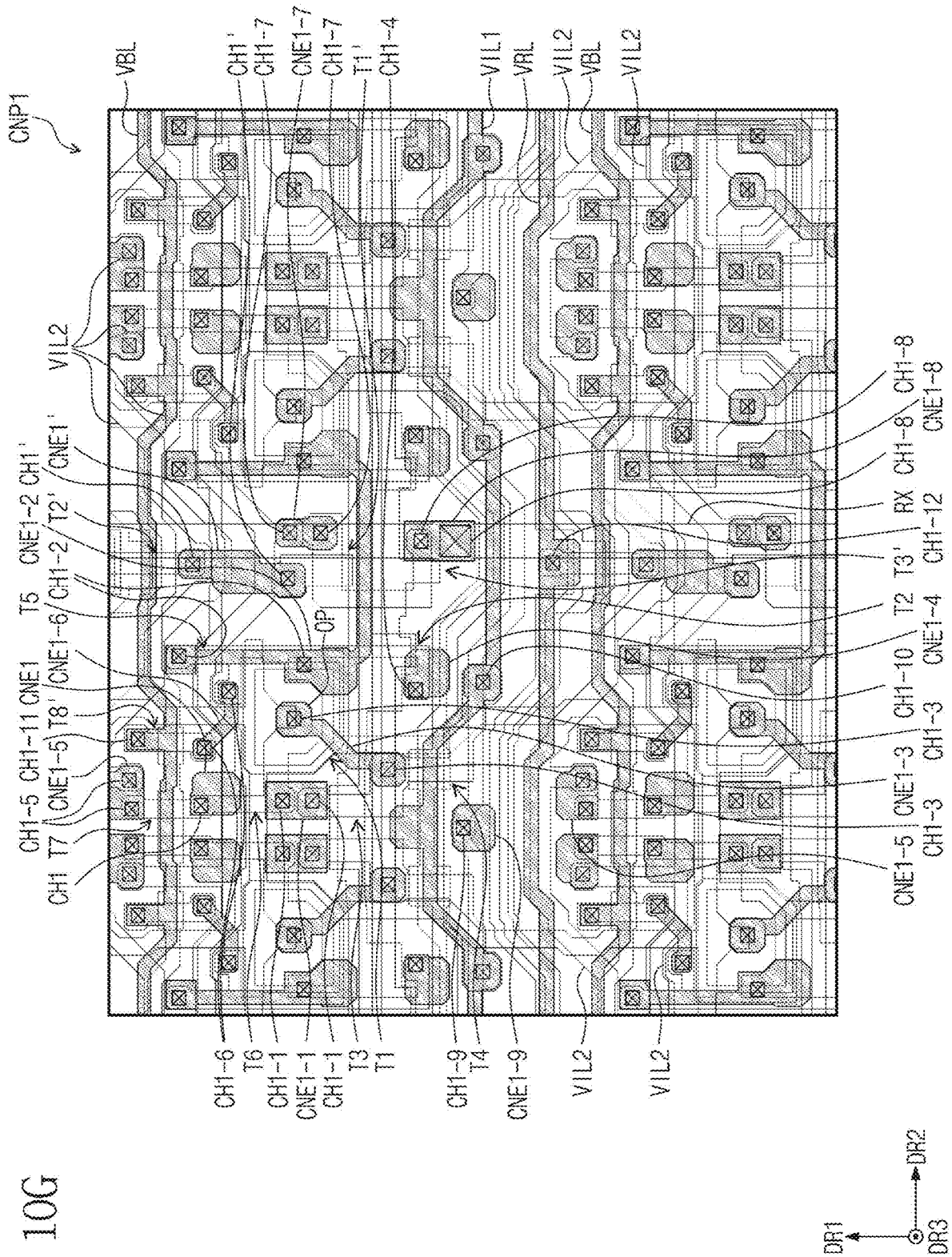
Figure 10H:
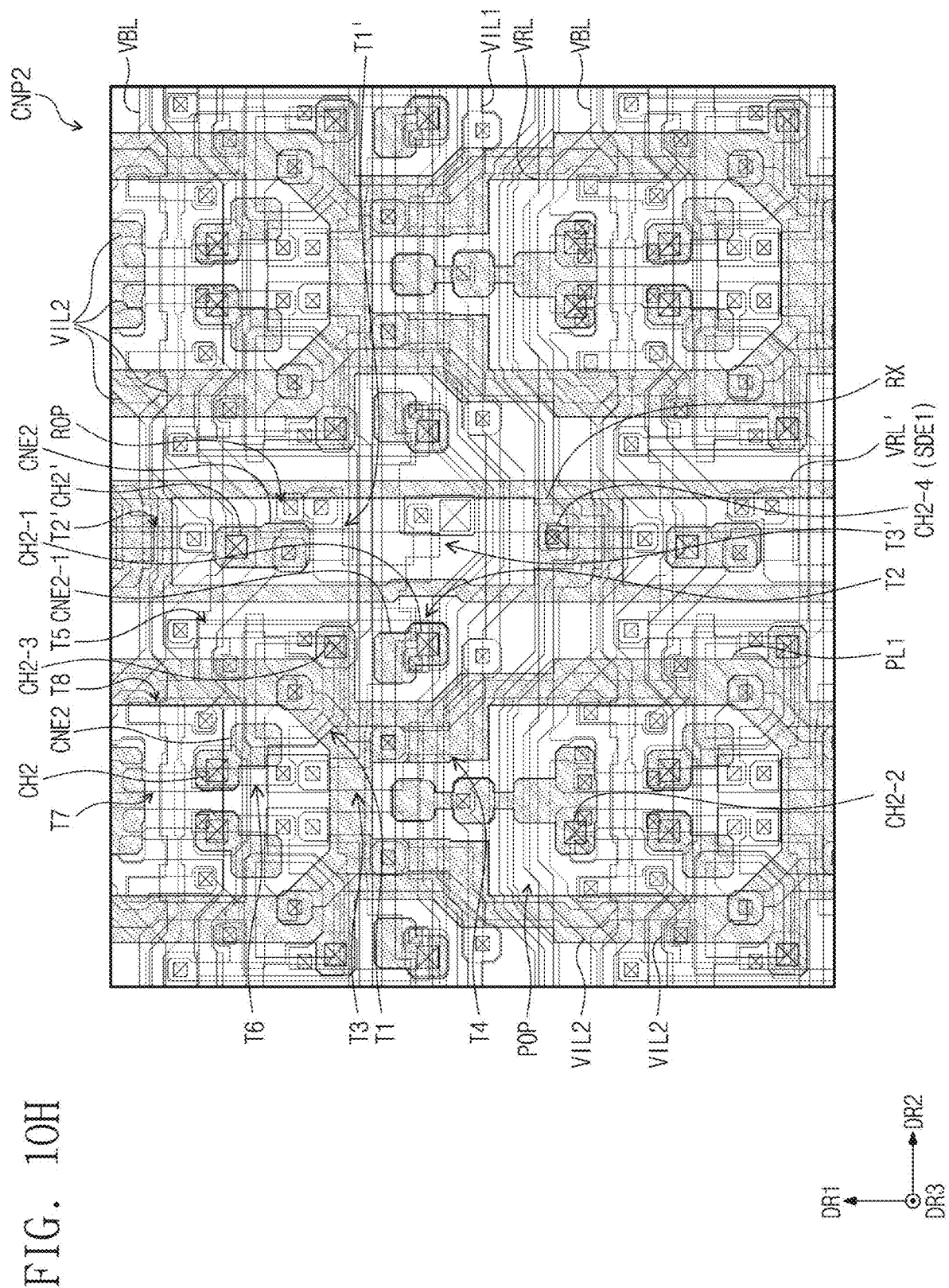
Figure 10I:
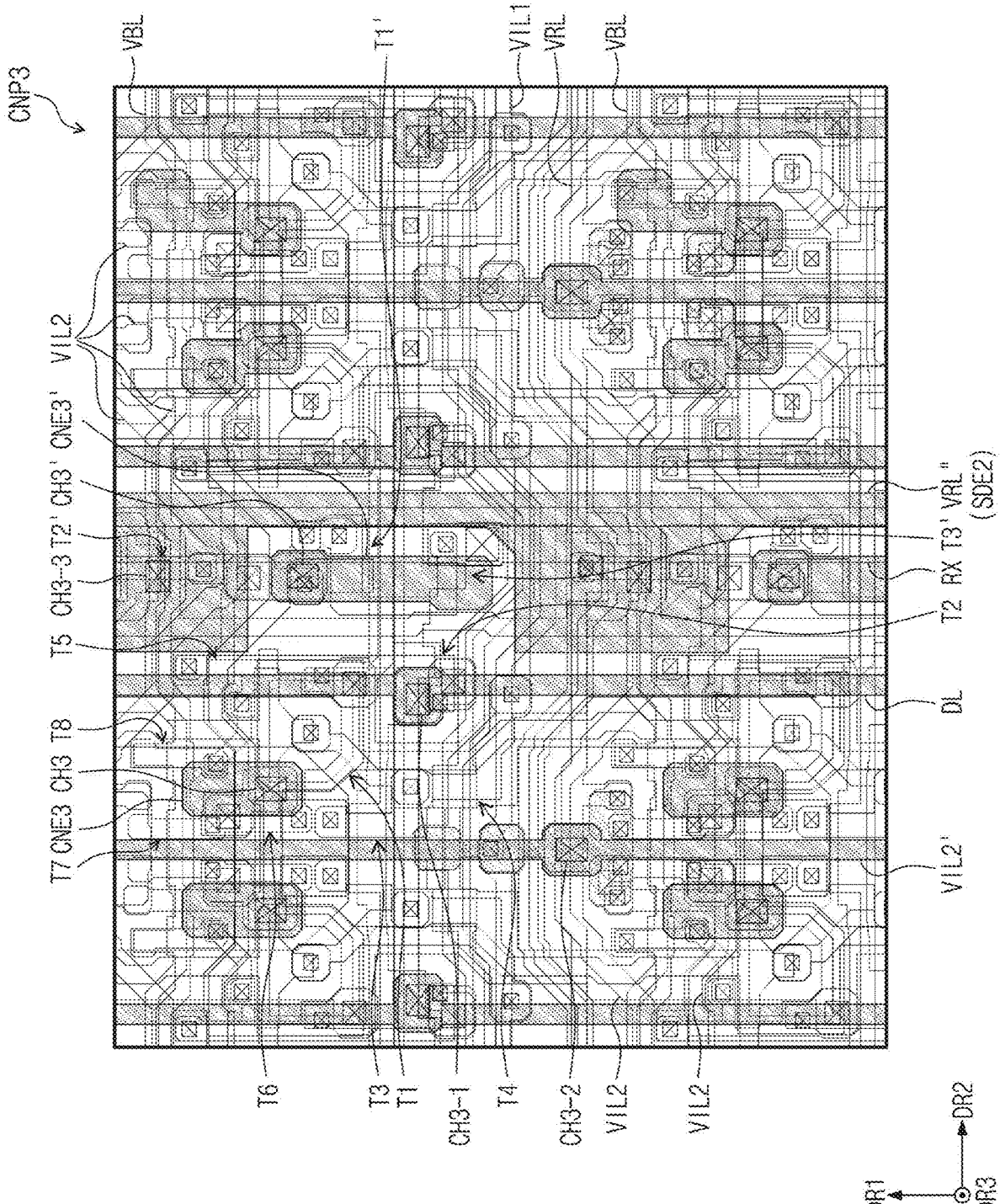

In addition, in FIGS. 10G to 10I, the reference numerals of the write scan line GW, the compensating scan line GC, the initializing scan line GI, the bias scan line GB, and the reset scan line GR are also omitted. FIGS. 10G to 10I illustrate the reference numerals for the first to eighth transistors T1 to T8 and the first to third transistors T1' to T3'.

Referring to FIG. 10G, a first connection pattern CNP1 may be located on the third gate pattern GPT3. The first connection pattern CNP1 may include the first connection electrodes CNE1, CNE1', and CNE1-1 to CNE1-9, the first initializing line VIL1, the reset line VRL, and the bias line VBL. The first connection electrode CNE1 may be the first connection electrode CNE1 illustrated in FIG. 6. The first connection electrode CNE1' may be the first connection electrode CNE1' illustrated in FIG. 7.

The first initializing line VIL1, the reset line VRL, and the bias line VBL may extend in the second direction DR2 and may be arranged in the first direction DR1. The first initializing line VIL1 may be adjacent to the fourth transistor T4. The reset line VRL may be adjacent to the second transistor T2'. The bias line VBL may be adjacent to the eighth transistor T8.

The first connection electrodes CNE1, CNE1', and CNE1-1 to CNE1-9, the first initializing line VIL1, the reset line VRL, and the bias line VBL may be located in the same layer. The first connection electrodes CNE1, CNE1', and CNE1-1 to CNE1-9, the first initializing line VIL1, the reset line VRL, and the bias line VBL may be formed by simultaneously patterning the same material.

A plurality of first contact holes CH1, CH1', and CH1-1 to CH1-12 may be defined. The first contact hole CH1 may be the first contact hole CH1 illustrated in FIG. 6. The first contact hole CH1', which overlaps the first gate electrode G1', of the first contact holes CH1' may be the first contact hole CH1' illustrated in FIG. 7. The first contact holes CH1-1 to CH1-12 may be formed similar to the first contact hole CH1 or the first contact hole CH1' illustrated in FIGS. 6 and 7.

The first connection electrode CNE1 may be connected to the sixth drain region D6 of the sixth transistor T6 through the first contact hole CH1.

The first connection electrode CNE1' may be connected to the first gate electrode G1' of the first transistor T1' and the second source region S2' of the second transistor T2' through the first contact holes CH1'. The first transistor T1' and the second transistor T2' may be connected to each other through the first connection electrode CNE1'.

The first connection electrode CNE1-1 may be connected to the third transistor T3 and the first and sixth transistors T1 and T6 through the first contact holes CH1-1. The first connection electrode CNE1-1 may be connected to the first drain region D1 of the first transistor T1, the sixth source region S6 of the sixth transistor T6, and the third drain region D3 of the third transistor T3. The third transistor T3 may be connected to the first and sixth transistors T1 and T6 by the (1-1)-th connection electrode CNE1-3.

The first connection electrode CNE1-2 may be connected to the dummy electrode DME of the fifth transistor T5 and the capacitor CST through the first contact holes CH1-2. The first connection electrode CNE1-2 may be connected to the fifth source region S5 of the fifth transistor T5.

The first connection electrode CNE1-3 may be connected to the third and fourth transistors T3 and T4 and the first gate electrode G1 of the first transistor T1 through the first contact holes CH1-3. The first connection electrode CNE1-3 may be connected to the third source region S3 of the third transistor T3 and the fourth drain region D4 of the fourth transistor T4. The third and fourth transistors T3 and T4 may be connected to the first transistor T1 by the first connection electrode CNE1-3.

The opening OP may be formed in the dummy electrode DME such that a portion of the first gate electrode G1 may be exposed by the opening OP. Since the first contact hole CH1-3 is formed to overlap the opening OP, the first connection electrode CNE1-3 may be easily connected to the first gate electrode G1.

The first connection electrode CNE1-4 may be connected to the second transistor T2 through the first contact hole CH1-4. The first connection electrode CNE1-4 may be connected to the second source region S2 of the second transistor T2.

The first connection electrode CNE1-5 may be connected to the seventh transistor T7 and any one of the second initializing line VIL2 through first contact holes CH1-5. The first connection electrode CNE1-5 may be connected to the seventh drain region D7 of the seventh transistor T7 through the first contact hole CH1-5. The seventh transistor T7 may be connected to the second initializing line VIL2 by the first connection electrode CNE1-5.

The first connection electrode CNE1-6 may be connected to the fifth transistor T5 and the eighth transistor T8 through the first contact holes CH1-6. The first connection electrode CNE1-6 may be connected to the fifth drain region D5 of the fifth transistor T5 and the eighth drain region D8 of the eighth transistor T8 through the first contact holes CH1-6. The fifth transistor T5 may be connected to the eighth transistor T8 by the first connection electrode CNE1-6.

The first connection electrode CNE1-7 may be connected to the first transistor T1' and any one of the second initializing lines VIL2 through the first contact holes CH1-7. The first connection electrode CNE1-7 may be connected to the first source region S1' of the first transistor T1' through the first contact hole CH1-7. The first transistor T1' may be connected to the second initializing line VIL2 by the first connection electrode CNE1-7.

The first connection electrode CNE1-8 may be connected to the third transistor T3' and the receive line RX through the first contact holes CH1-8. The first connection electrode CNE1-8 may be connected to the third drain region D3' of the third transistor T3'. The sensing circuit SNC may be connected to the receive line RX by the first connection electrode CNE1-8.

The (1-9)-th connection electrode CNE1-9 may be connected to the sub-dummy electrode SDE' illustrated in FIG. 10D through the first contact hole CH1-9.

The first initializing line VIL1 may be connected to the fourth transistor T4. The first initializing line VIL1 may be connected to the fourth source region S4 of the fourth transistor T4 through the first contact holes CH1-10.

The bias line VBL may be connected to the eighth transistor T8. The bias line VBL may be connected to the eighth source region S8 of the eighth transistor T8 through the first contact hole CH1-11.

The reset line VRL may be connected to the second transistor T2'. The reset line VRL may be connected to the second drain region D2' of the second transistor T2' through the first contact holes CH1-12.

In the following description made with reference to FIGS. 10H to 10I, for the convenience of explanation and the brief reference numeral, reference numerals for the first connection electrodes CNE1, CNE1', and CNE1-1 to CNE1-9, the first contact holes CH1, CH1', and CH1-1 to CH1-12, and the dummy electrodes DME are omitted.

Referring to FIGS. 10A to 10H, a second connection pattern CNP2 may be located on the first connection pattern CNP1. The second connection pattern CNP2 may include the second connection electrodes CNE2, CNE2', and CNE2-1 to CNE2-2, the first power line PL1, and the reset line VRL'.

The second connection electrode CNE2 may be the second connection electrode CNE2 illustrated in FIG. 6. The second connection electrode CNE2' may be the second connection electrode CNE2' illustrated in FIG. 7.

The first power line PL1 may extend in the first direction DR1 and may overlap the pixel circuits PC. The reset line VRL' may extend in the second direction DR2 and may overlap the sensing circuits SNC.

An opening POP may be defined in the first power line PL1, and second connection electrodes CNE2 and CNE2-2 may be located in the opening POP. An opening ROP may be defined in the reset line VRL', and the second connection electrode CNE2' may be located in the opening ROP. The second connection electrode CNE2-1 may be interposed between the first power line PL1 and the reset line VRL'.

The second connection electrodes CNE2, CNE2', and CNE2-1 to CNE2-2, the first power line PL1, and the reset line VRL' may be located in the same layer. The second connection electrodes CNE2, CNE2', and CNE2-1 to CNE2-2, the first power line PL1, and the reset line VRL' may be formed by simultaneously patterning the same material.

A plurality of second contact holes CH2, CH2', and CH2-1 to CH2-4 may be defined. The second contact hole CH2 may be the second contact hole CH2 illustrated in FIG. 6. The second contact hole CH2' may be the second contact hole CH2' illustrated in FIG. 7. The second contact holes CH2-1 to CH2-4 may be formed similar to the second contact holes CH2 and CH2' illustrated in FIGS. 6 and 7.

The second connection electrode CNE2 may be connected to the first connection electrode CNE1 through the second contact hole CH2. Accordingly, the second connection electrode CNE2 may be connected to the sixth transistor T6 through the first connection electrode CNE1.

The second connection electrode CNE2' may be connected to the first connection electrode CNE1' through the second contact hole CH2'. Accordingly, the second connection electrode CNE2' may be connected to the second transistor T2' through the first connection electrode CNE1'.

The second connection electrode CNE2-1 may be connected to the first connection electrode CNE1-4 through the second contact hole CH2-1. Accordingly, the second connection electrode CNE2-1 may be connected to the second transistor T2 through the first connection electrode CNE1-4.

The second connection electrode CNE2-2 may be connected to the first connection electrode CNE1-5 through the second contact hole CH2-2. Accordingly, the second connection electrode CNE2-2 may be connected to the second initializing line VIL2 through the first connection electrode CNE1-5.

In FIG. 10H, the second connection electrodes CNE2-3 may be located at the left and right sides. The second connection electrode CNE2-2 at the left side may be connected to one first connection electrode CNE1-5 through one second contact hole CH2-2. The second connection electrode CNE2-2 at the right side may be connected to the two second connection electrodes CNE1-5 through two second contact holes CH2-2.

The first power line PL1 may be connected to the first connection electrode CNE1-2 through the second contact hole CH2-3. Accordingly, the first power line PL1 may be connected to the fifth transistor T5 and the dummy electrode DME through the first connection electrode CNE1-2.

The reset line VRL' may be connected to the reset line VRL through the second contact hole CH2-4. The reset line VRL' may be connected to the second transistor T2' through the reset line VRL. The reset line VRL and the reset line VRL' may be connected to each other to receive the reset voltage VRST which is a constant voltage. The reset line VRL' may overlap a portion of the receive line RX. The reset line VRL' may be defined as a first shielding electrode SHE1.

In FIG. 10I below, for the brief reference numerals, the reference numerals for the second connection electrodes CNE2, CNE2', and CNE2-1 to CNE2-2 and the second contact holes CH2, CH2', and CH2-1 to CH2-4 are omitted.

Referring to FIGS. 10A to 10I, a third connection pattern CNP3 may be located on the second connection pattern CNP2. The third connection pattern CNP3 may include a plurality of third connection electrodes CNE3 and CNE3', the data line DL, the reset line VRL', and a second initializing line VIL2'.

The third connection electrode CNE3 may be the third connection electrode CNE3 illustrated in FIG. 6. The third connection electrode CNE3' may be the third connection electrode CNE3' illustrated in FIG. 7.

The data line DL, a reset line VRL", and the second initializing line VIL2' may extend in the first direction DR1 and may be arranged in the second direction DR2. The data line DL and the second initializing line VIL2' may overlap the pixel circuits PC, and the reset line VRL" may overlap the sensing circuits SNC.

The third connection electrode CNE3 may be located between the second initializing line VIL2' and the data line DL. The data line DL may be located between the second initializing line VIL2' and the reset line VRL".

The third connection electrodes CNE3 and CNE3', the data line DL, the reset line VRL", and the second initializing line VIL2' may be located in the same layer. The third connection electrodes CNE3 and CNE3', the data line DL, the reset line VRL", and the second initializing line VIL2' may be formed by simultaneously patterning with the same material.

A plurality of third contact holes CH3, CH3', and CH3-1 to CH3-3 may be defined. The third contact hole CH3 may be the third contact hole CH3 illustrated in FIG. 6. The third contact hole CH3' may be the third contact hole CH3' illustrated in FIG. 7. The third contact holes CH3-1 to CH3-3 may be formed similarly to the third contact holes CH3 and CH3' illustrated in FIGS. 6 and 7.

The third connection electrode CNE3 may be connected to the second connection electrode CNE2 through the third contact hole CH3. According to some embodiments, the third connection electrode CNE3 may be connected to the first electrode AE through the fourth contact hole CH4 illustrated in FIG. 6. Therefore, the first electrode AE may be connected to the sixth transistor T6 through the first connection electrode CNE1, the second connection electrode CNE2, and the third connection electrode CNE3.

The third connection electrode CNE3' may be connected to the second connection electrode CNE2' through the third contact hole CH3'. According to some embodiments, the third connection electrode CNE3' may be connected to the first electrode AE' illustrated in FIG. 7 through the fourth contact hole CH4' illustrated in FIG. 7. Therefore, the first electrode AE' may be connected to the second transistor T2' through the first connection electrode CNE1', the second connection electrode CNE2', and the third connection electrode CNE3'.

The data line DL may be connected to the second connection electrode CNE2-1 through the third contact hole CH3-1. Accordingly, the data line DL may be connected to the second transistor T2 through the first connection electrode CNE1-4 and the second connection electrode CNE2-1.

The second initializing line VIL2' may be connected to the second connection electrode CNE2-2 through the third contact hole CH3-2. Accordingly, the second initializing line VIL2' may be connected to the second initializing line VIL2 through the second connection electrode CNE2-2 and the first connection electrode CNE1-5. The second initializing voltage AINT may be provided to the seventh transistor T7 by the second initializing line VIL2' and the second initializing line VIL2.

The reset line VRL" may be connected to the reset line VRL' through the third contact hole CH3-3. The reset line VRL" may be connected to the reset line VRL through the reset line VRL'. The reset voltage VRST may be provided to the second transistor T2' by the reset line VRL, the reset line VRL', and the reset line VRL'". The reset line VRL" may overlap a portion of the receive line RX. The reset line VRL" may be defined as a second shielding electrode SHE2.

When viewed in a plan view, the data lines DL may be located at the left and right sides of the reset lines VRL' and VRL'". In other words, the reset lines VRL' and VRL" may be located between the data lines DL.

The data voltages VD applied to the data lines DL may be a pulse-type signal. The pulse-type signal may affect the sensing signal RS output through the receive line RX.

When viewed in a plan view, the reset lines VRL' and VRL'" are placed between the data lines DL and overlap the receive line RX to block the effect of the pulse-type data voltage VD on the sensing signal RS. In other words, the reset lines VRL' and VRL'" may serve as shielding electrodes. The reset lines VRL' and VRL'" may receive the reset voltage VRST which is a constant voltage to serve as a shielding electrode.

Figure 11:
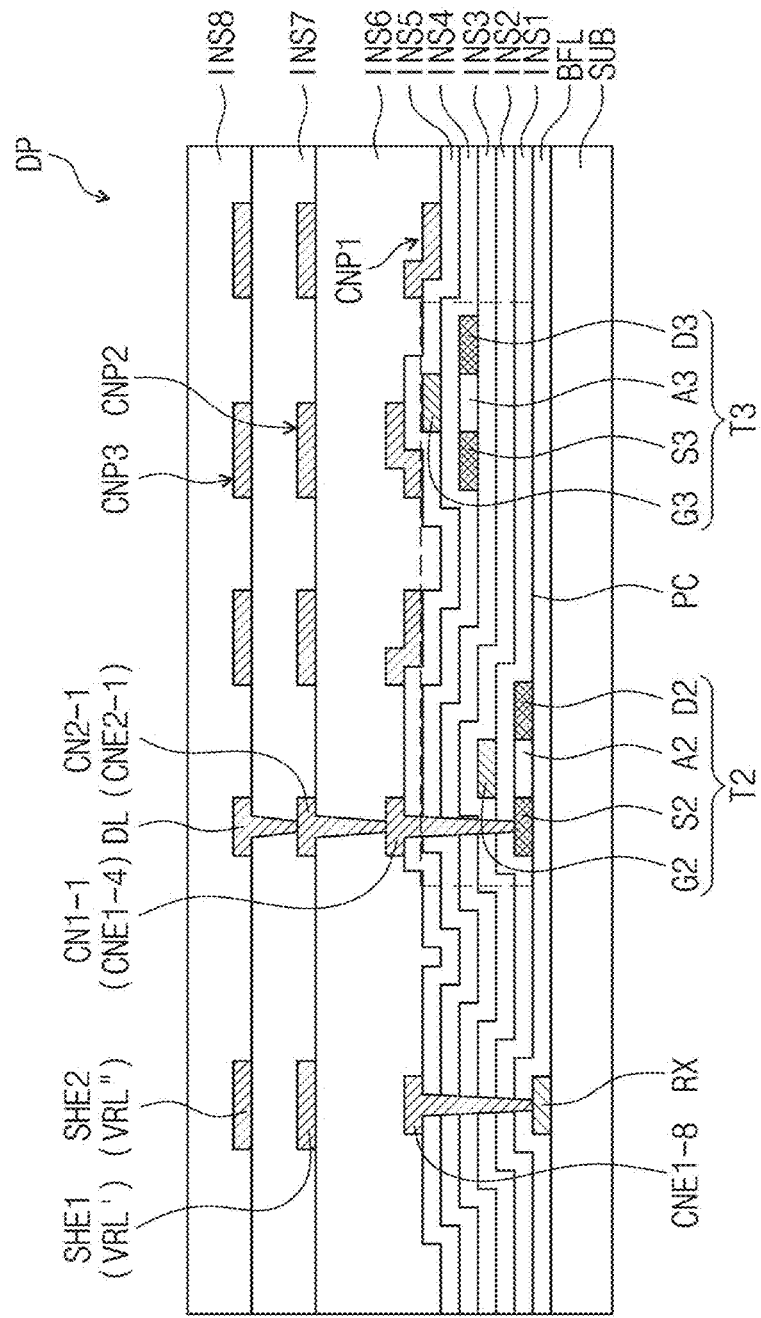
FIG. 11 is a schematic cross-sectional view illustrating a portion of a display panel in which a receive line and a data line are locates in FIGS. 10A to 10I.

FIG. 11 is a schematic cross-sectional view illustrating a portion of a display panel in which a receive line and a data line are located in FIGS. 10A to 10I.

For example, FIG. 11 illustrates the receive line RX, the first connection electrode CNE1-8 connected to the receive line RX, first and second shielding electrodes SHE1 and SHE2 defined by the reset lines VRL' and VRL'", the data line DL, and the connection electrodes CNE1-4 and CNE2-2 connected to the data line DL and the second and third transistors T2 and T3. In addition, some electrode patterns of the first, second, and third connection patterns CNP1, CNP2, and CNP3 around the second and third transistors T2 and T3 were illustrated as an example.

In FIG. 11, for convenience of explanation, reference numerals for the contact holes illustrated in FIGS. 10A to 10I are omitted.

FIG. 11 will be described together with FIG. 6 if necessary.

Referring to FIGS. 6 and 11, the first connection electrode CNE1-8 may be located below the data line DL without overlapping the data line DL when viewed in a plan view. The receive line RX may be located under the first connection electrode CNE1-8 and connected to the first connection electrode CNE1-8.

The receive line RX may not be located in the same layer as the second connection pattern CNP2. In addition, the receive line RX may not be located in the same layer as the third connection pattern CNP3. According to some embodiments of the present disclosure, the receive line RX may be located in the same layer as the lower metal layer BML under the first connection electrode CNE1-8 such that the receive line RX is farther spaced apart from the data line DL.

The capacitance of the capacitor may be inversely proportional to the distance between the conductors. The receive line RX may be located in the same layer as the second connection pattern CNP2 or the third connection pattern CNP3 and may be located adjacent to the data line DL. In this case, the capacitance of the parasitic capacitor formed between the receive line RX and the data line DL may be increased.

As the capacity of the parasitic capacitor is increased, the noise of the sensing signal RS output through the receive line RX may be increased depending on the influence of the pulse-type data voltage VD applied to the data line DL. This phenomenon may be defined as a coupling phenomenon. As the capacitance of the parasitic capacitor is increased, the coupling phenomenon may be increased.

However, according to some embodiments of the present disclosure, the receive line RX may be located in the same layer as the lower metal layer BML to be away from the data line DL. In this case, the capacity of the parasitic capacitor formed between the receive line RX and the data line DL may be relatively reduced, and the coupling phenomenon may be relatively reduced. Accordingly, the effect of the data voltage VD on the sensing signal RS output through the receive line RX may be relatively reduced, thereby relatively reducing the noise of the sensing signal RS. Accordingly, the sensing sensitivity of the sensor SN may be relatively improved.

For example, when the receive line RX overlaps the sensing circuit SNC and is placed on the same layer as the second connection pattern CNP2, the capacity of the parasitic capacitor formed by the receive line RX and the data line DL was measured as 257.1 [fF]. However, according to some embodiments of the present disclosure, when the receive line RX overlaps the sensing circuit SNC and is placed in the same layer as the lower metal layer BML, the capacity of the parasitic capacitor formed by the receive line RX and the data line DL was measured as 45 [fF].

Hereinafter, the first connection electrode CNE1-4 is defined as a (1-1)-th connection electrode CN1-1, and the second connection electrode CNE2-1 is defined as a (2-1)-th connection electrode CN2-1.

The connection electrode CN1-1 may be located on the pixel circuit PC and connected to the second transistor T2. The (2-1)-th connection electrode CN2-1 may be located on the (1-1)-th connection electrode CN1-1 and connected to the (1-1)-th connection electrode CN1-1. The data line DL may be located on the (2-1)-th connection electrode CN2-1 and connected to the (2-1)-th connection electrode CN2-1.

The first connection electrode CNE1-8 may be located in the same layer as the (1-1)-th connection electrode CN1-1. The (2-1)-th connection electrode CN2-1 may be located above the first connection electrode CNE1-8.

The first and second shielding electrodes SHE1 and SHE2 may be located on the receive line RX. The first shielding electrode SHE1 may be located on the first connection electrode CNE1-8, and may overlap a part of the receiving line RX when viewed in a plan view, as described above. The first shielding electrode SHE1 may be located in the same layer as the (2-1)-th connection electrode CN2-1. The first shielding electrode SHE1 may be located under the data line DL.

The shielding electrode SHE2 may be located on the first shielding electrode SHE1 and connected to the first shielding electrode SHE1. As described above, the second shielding electrode SHE2 may overlap a portion of the receive line RX when viewed in a plan view. The second shielding electrode SHE2 may be located in the same layer as the data line DL and adjacent to the data line DL.

The first and second shielding electrodes SHE1 and SHE2 may receive a reset voltage VRST, which is a constant voltage, to serve as a shielding electrode. The influence of the data voltage VD for the sensing signal RS may be blocked by the first and second shielding electrodes SHE1 and SHE2.

As illustrated in FIGS. 10H and 10I, the reset lines VRL' and VRL" defining the first and second shielding electrodes SHE1 and SHE2 may be connected to the reset line VRL. Accordingly, the first and second shielding electrodes SHE1 and SHE2 may be connected to the reset line VRL. As illustrated in FIG. 10G, the reset line VRL may be located in the same layer as the first connection electrode CNE1-8.

Figure 12:
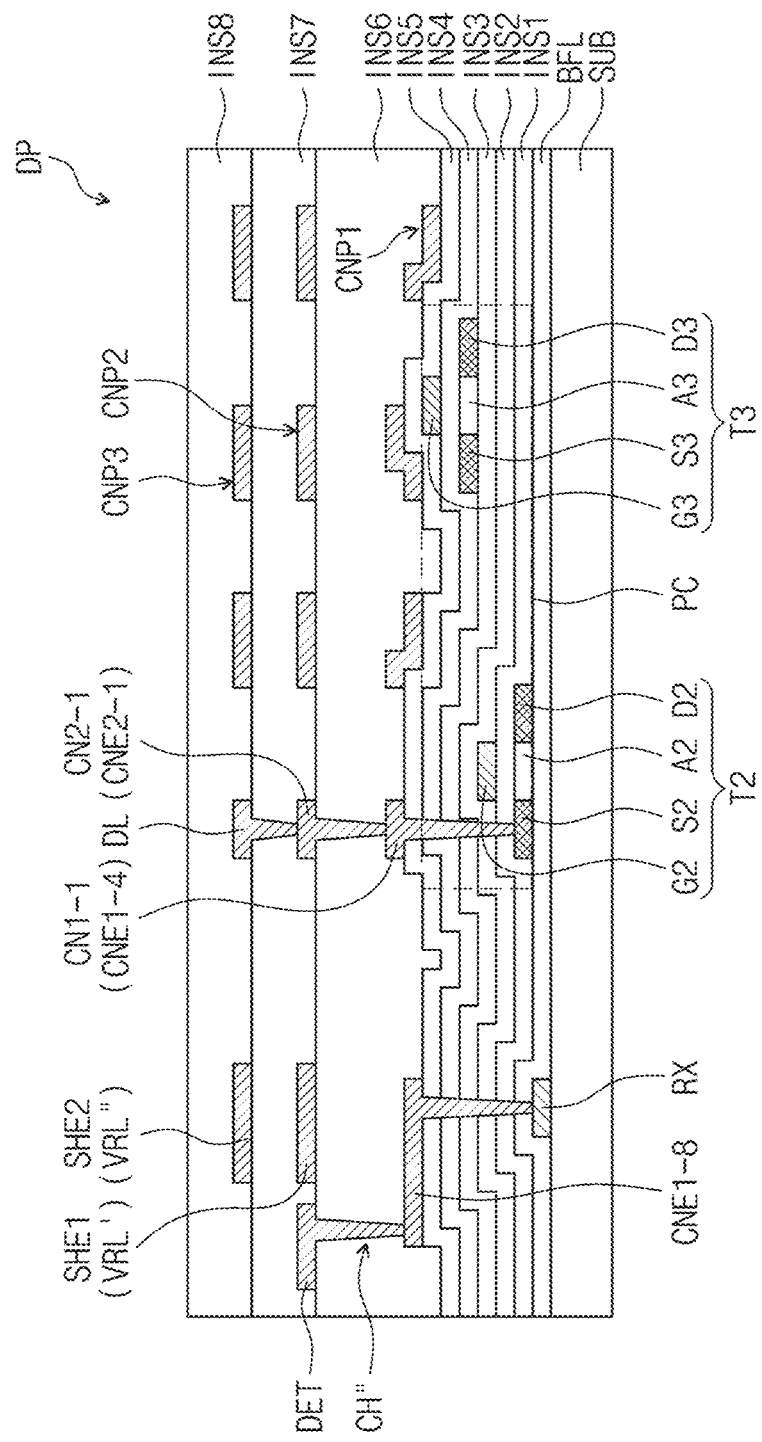
FIG. 12 is a cross-sectional view illustrating a display panel, according to some embodiments of the present disclosure.

FIG. 12 is a view illustrating a cross-sectional structure of a display panel according to some embodiments of the present disclosure.

FIG. 12 is illustrated in a cross-sectional view corresponding to FIG. 11, and hereinafter, the configuration illustrated in FIG. 12 will be described while focusing a configuration different from the configuration illustrated in FIG. 11.

Referring to FIG. 12, the display panel DP may further include a dummy electrode DET. The dummy electrode DET may be located on the sixth insulating layer INS6. The dummy electrode DET may be located in the same layer as the second connection pattern CNP2. The dummy electrode DET may be connected to the first connection electrode CNE1-8 through a contact hole CH" defined in the sixth insulating layer INS6. Additionally, since the dummy electrode DET is connected to the first connection electrode CNE1-8, the wiring resistance of the receive line RX may be relatively reduced.

According to some embodiments of the present disclosure, the receive line of the sensor is provided in the same as the lower metal layer, such that the receive line is farther spaced apart from the data line. Accordingly, as the impact by the data voltage on the sensing signal output through the receive line is relatively reduced, the nose of the sensing signal output through the receive line may be relatively reduced. Accordingly, the sensitivity of the sensor may be relatively improved.

Although aspects of some embodiments of the present disclosure have been described for illustrative purposes, those skilled in the art will appreciate that various modifications, and substitutions are possible, without departing from the scope and spirit of the invention as disclosed in the accompanying claims. Accordingly, the technical scope of the present disclosure is not limited to the detailed description of this specification, but should be defined by the claims.

While the present disclosure has been described with reference to embodiments thereof, it will be apparent to those of ordinary skill in the art that various changes and modifications may be made thereto without departing from the spirit and scope of the present disclosure as set forth in the following claims, and their equivalents.

What is claimed is:

1. A display device comprising:
   a data line;
   a pixel circuit connected to the data line;
   a light emitting element connected to the pixel circuit;
   a first connection electrode under a layer at which the data line is located;
   a sensing circuit connected to the first connection electrode;
   a light receiving element connected to the sensing circuit; and
   a receive line under a layer at which the first connection electrode is located and connected to the first connection electrode.

2. The display device of claim 1, wherein the receive line is under the sensing circuit.

3. The display device of claim 1, further comprising a lower metal layer under the pixel circuit,
   wherein the receive line is in a same layer as the lower metal layer.

4. The display device of claim 3, wherein the receive line is separated from the lower metal layer.

5. The display device of claim 3, wherein the pixel circuit includes:
   a first transistor including a first electrode connected to a first power line, a second electrode connected to an anode of the light emitting element, and a control electrode connected to a first node;
   a second transistor including a first electrode connected to the data line, a second electrode connected to the first electrode of the first transistor, and a control electrode connected to a write scan line; and
   a capacitor connected to the first power line and the first node, and
   wherein the lower metal layer is under the first transistor.

6. The display device of claim 1, further comprising:
   a (1-1)-th connection electrode on the pixel circuit; and
   a (2-1)-th connection electrode on the (1-1)-th connection electrode and connected to the (1-1)-th connection electrode,
   wherein the data line is on the (2-1)-th connection electrode and connected to the (2-1)-th connection electrode.

7. The display device of claim 6, wherein the first connection electrode is in a same layer as the (1-1)-th connection electrode.

8. The display device of claim 6, further comprising:
   a first shielding electrode on the first connection electrode and overlapping a portion of the receive line in a plan view.

9. The display device of claim 8, wherein the first shielding electrode is in a same layer as the (2-1)-th connection electrode.

10. The display device of claim 8, further comprising:
    a second shielding electrode on the first shielding electrode and overlapping a portion of the receive line in the plan view.

11. The display device of claim 10, wherein the second shielding electrode is in a same layer as the data line and adjacent to the data line.

12. The display device of claim 10, wherein the second shielding electrode is connected to the first shielding electrode.

13. The display device of claim 10, wherein the first and second shielding electrodes receive a constant voltage.

14. The display device of claim 10, further comprising:
    a reset line connected to the sensing circuit and configured to receive a reset voltage.

15. The display device of claim 14, wherein the first and second shielding electrodes are connected to the reset line.

16. The display device of claim 14, wherein the reset line is in a same layer as the first connection electrode.

17. The display device of claim 1, further comprising:
    a dummy electrode on the first connection electrode and connected to the first connection electrode.

18. A display device comprising:
    a data line;
    a pixel circuit connected to the data line;
    a light emitting element connected to the pixel circuit;
    a lower metal layer under the pixel circuit;
    a receive line in a same layer as the lower metal layer;
    a sensing circuit overlapping the receive line; and
    a light receiving element connected to the sensing circuit.

19. The display device of claim 18, further comprising:
a first shielding electrode on the receive line and overlapping a portion of the receive line in a plan view; and
a second shielding electrode on the first shielding electrode and overlapping a portion of the receive line in the plan view.

20. The display device of claim 19, wherein the second shielding electrode is in a same layer as the data line,
wherein the first shielding electrode is under the data line, and
wherein the first and second shielding electrodes are configured to receive a constant voltage.

21. An electronic device comprising a display device for providing images:
wherein the display device comprises:
a data line;
a pixel circuit connected to the data line;
a light emitting element connected to the pixel circuit;
a first connection electrode under a layer at which the data line is located;
a sensing circuit connected to the first connection electrode;
a light receiving element connected to the sensing circuit; and
a receive line under a layer at which the first connection electrode is located and connected to the first connection electrode.

* * * * *